(12) United States Patent
Todoroki

(10) Patent No.: US 6,327,383 B2
(45) Date of Patent: *Dec. 4, 2001

(54) MULTI-COLOR IMAGE ENCODING APPARATUS AND METHOD, MULTI-COLOR IMAGE DECODING APPARATUS AND METHOD

(75) Inventor: Akinari Todoroki, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,392

(22) Filed: Jan. 13, 1998

(30) Foreign Application Priority Data

Jan. 14, 1997 (JP) .................................................... 9-005006

(51) Int. Cl.[7] ...................................................... G06K 9/36
(52) U.S. Cl. ............................ 382/166; 382/233; 382/247
(58) Field of Search ..................................... 382/162, 164, 382/166, 167, 173, 233, 238–240, 245–247; 358/261.1, 261.2, 514

(56) References Cited

U.S. PATENT DOCUMENTS

| 3,739,085 | 6/1973 | Rosen et al. ............................... 178/6 |
| 4,325,085 | 4/1982 | Gooch .................................. 358/261 |
| 4,344,086 | 8/1982 | Mizuno ................................. 358/261 |
| 4,652,856 | 3/1987 | Mohiuddin et al. .................. 235/310 |
| 4,905,297 | 2/1990 | Langdon, Jr. et al. ........... 358/261.2 |
| 4,935,882 | 6/1990 | Pennebaker et al. ................. 364/554 |
| 5,297,220 | * 3/1994 | Nomizu ................................. 382/247 |
| 5,317,428 | 5/1994 | Osawa et al. ......................... 358/539 |
| 5,764,804 | * 6/1998 | Yajima et al. ........................ 382/238 |
| 5,809,176 | * 9/1998 | Yajima ................................. 382/247 |
| 5,848,185 | * 12/1998 | Koga et al. ........................... 382/164 |
| 5,859,926 | * 1/1999 | Asahi et al. .......................... 382/166 |

FOREIGN PATENT DOCUMENTS

| 62-185413 | 8/1987 | (JP) . |
| 63 76525 A | 4/1988 | (JP) . |
| 63-74324 | 4/1988 | (JP) . |
| 63-76525 | 4/1988 | (JP) . |
| 5-328142 | 12/1993 | (JP) . |
| 6-276041 | 9/1994 | (JP) . |
| 62 76041 A | 9/1994 | (JP) . |

OTHER PUBLICATIONS

Joint Bi–level Image Expert Group (JBIG) International Standard ISO/IEC DIS 11544), 1992.

* cited by examiner

Primary Examiner—Bhavesh Mehta
(74) Attorney, Agent, or Firm—Oliff & Berridge, PLC

(57) ABSTRACT

The multi-color image encoding and/or decoding apparatus may contain a color order table which is created by combining a upper two-dimensional color order table having the two-dimensional perimeter pixel data and a one-dimensional color order table for lower color orders which are created by a latest appearance table creation operation to move the color order of the color symbol corresponding to the color pixel data most recently input up to an uppermost line. Moreover, a strip creation and combination device partitions the target image into strips with the horizontal width consisting of a limited number of pixels is provided to successively encode within each strip and to decode in strip shape.

32 Claims, 24 Drawing Sheets

| STATUS | CX (STATUS SIGNAL) | NUMBER OF COLORS |
|---|---|---|
| A = B = C = D | 0 | 1 |
| A = B = C ≠ D | 1 | 2 |
| A = B = D ≠ C | 1 | 2 |
| A = C = D ≠ B | 1 | 2 |
| B = C = D ≠ A | 1 | 2 |
| A = B  C = D  B ≠ C | 1 | 2 |
| A = C  B = D  B ≠ C | 1 | 2 |
| A = D  B = C  B ≠ D | 1 | 2 |
| A = B  A ≠ C  A ≠ D  C ≠ D | 2 | 3 |
| A = C  A ≠ B  A ≠ D  B ≠ D | 2 | 3 |
| A = D  A ≠ B  A ≠ C  B ≠ C | 2 | 3 |
| B = C  A ≠ B  B ≠ D  A ≠ D | 2 | 3 |
| B = D  A ≠ B  B ≠ C  A ≠ C | 2 | 3 |
| A ≠ B  A ≠ C  A ≠ D  B ≠ C  B ≠ D   C ≠ D | 3 | 4 |

| TWO-DIMENSIONAL COLOR ORDER TABLE | COLOR ORDER | POSITION | COLOR SYMBOL |
|---|---|---|---|
| | 0TH ORDER | P0 | C4 |
| | 1ST ORDER | P1 | C3 |
| | 2ND ORDER | P2 | C5 |
| | 3RD ORDER | P3 | C6 |

FIG.6

| ONE-DIMENSIONAL COLOR ORDER TABLE | COLOR ORDER | POSITION | COLOR SYMBOL |
|---|---|---|---|
| | 0TH ORDER | T0=P0 | C4 |
| | 1ST ORDER | T1=T2=T4 | C2 |
| | 2ND ORDER | T3 | C5 |
| | 3RD ORDER | T5 | C8 |
| | ... | ... | ... |
| | 255TH ORDER | | |

FIG.7

| LATEST APPEARANCE TABLE | COLOR SYMBOL | POSITION | CODE |
|---|---|---|---|
| 0TH ORDER | C4 | P0=T0 | 0 |
| 1ST ORDER | C3 | P1 | 1 |
| 2ND ORDER | C5 | P2 | 2 |
| 3RD ORDER | C6 | P3 | 3 |
| 4TH ORDER | C2 | T1 | 4 |
| 5TH ORDER | C5 | | 5 |
| 6TH ORDER | C8 | | 6 |
| ... | ... | | 7 |
| 15TH ORDER | Cn | | ... |
| ... | | | |
| 255TH ORDER | | T252 | ESC+0 |
| 256TH ORDER | | T253 | ESC+1 |
| 257TH ORDER | | T254 | ESC+2 |
| 258TH ORDER | | T255 | ESC+3 |

FIG.8

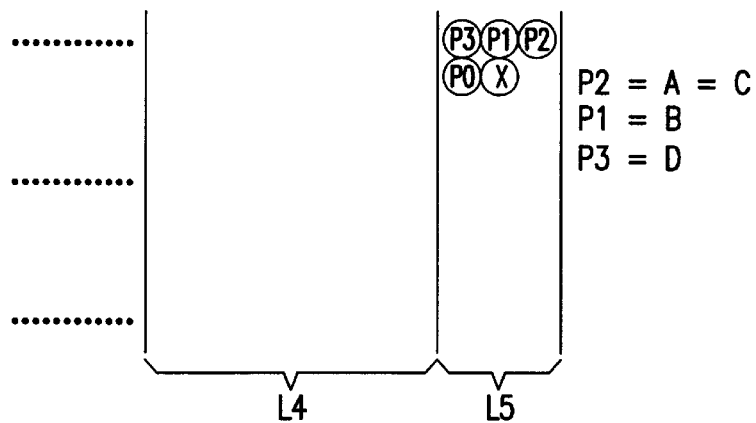
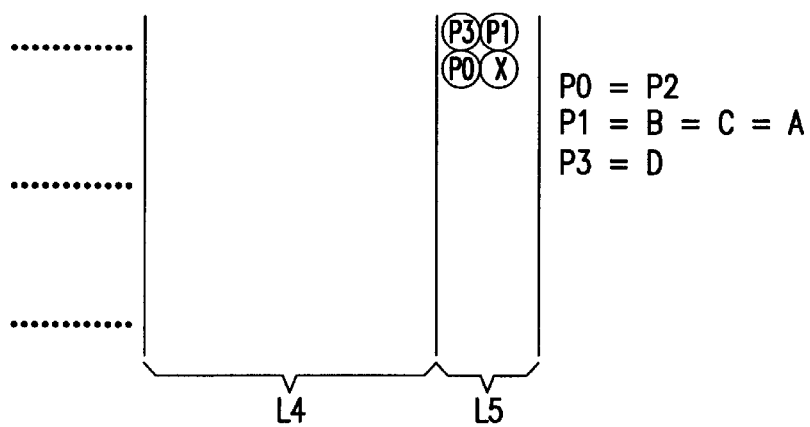
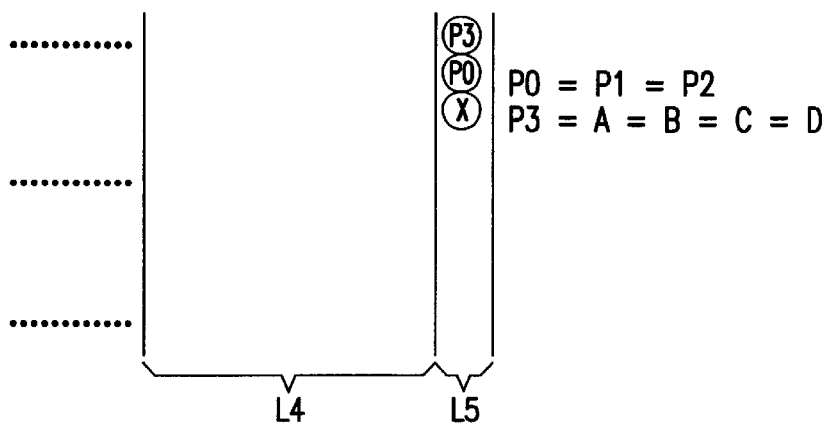

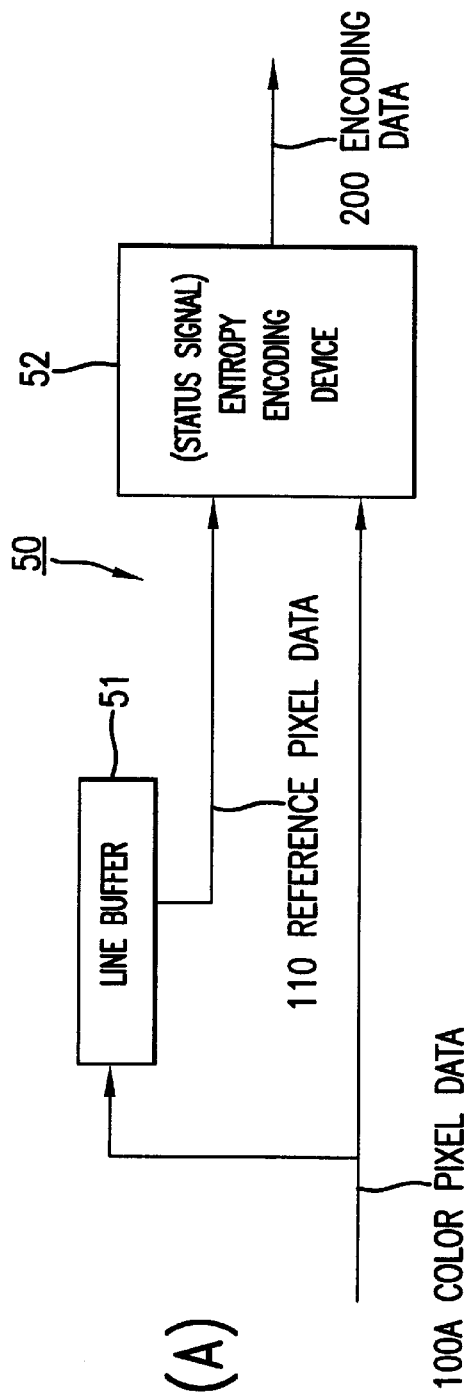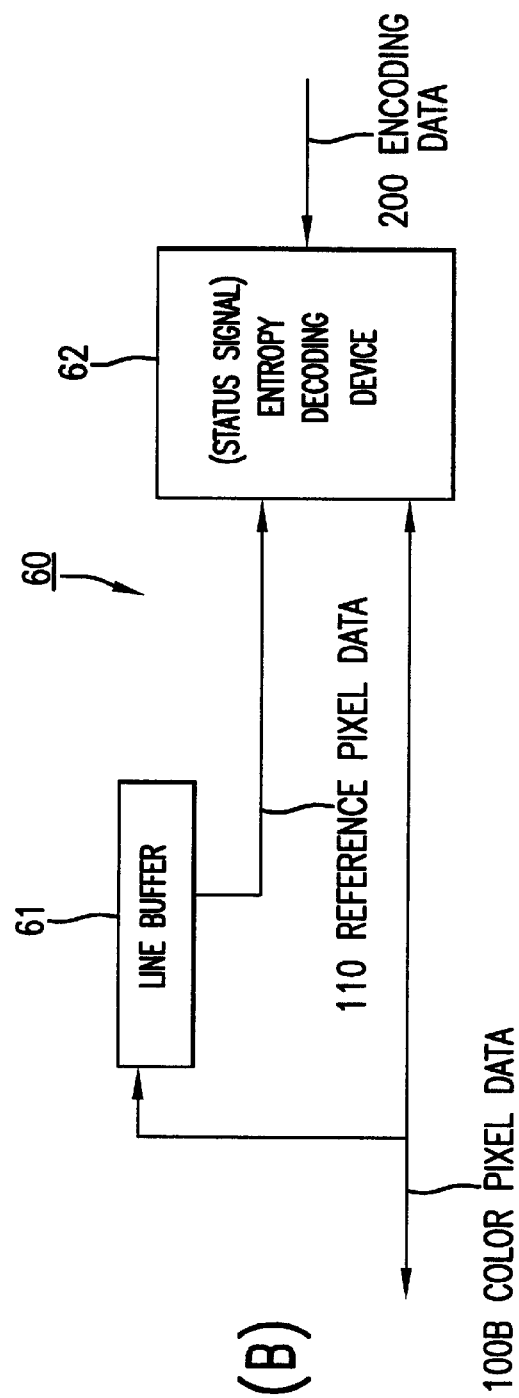

| REFERENCE PIXEL PATTERN | INDEX | APPEARANCE FREQUENCY OF EACH COLOR ||||| ... | P |
|---|---|---|---|---|---|---|---|---|
| | | A | B | C | D | E | | |
| | 0 | 64,936 | 15,882 | 26,320 | 7,669 | 5,634 | | 2,634 |
| | 1 | 5,553 | 36,214 | 18,776 | 20,365 | 6,046 | | 953 |
| | 2 | 33,365 | 18,247 | 22,563 | 4,423 | 10,012 | | 1,359 |
| | 3 | 9,569 | 33 | 13,456 | 562 | 356 | | 224 |
| | 4 | 11,236 | 36,877 | 25,650 | 1,096 | 532 | | 1,096 |
| | 65535 | 4,963 | 15,689 | 45,678 | 2,236 | 3,326 | | 63,697 |

A,B,C .... P : COLOR SYMBOLS

FIG.18

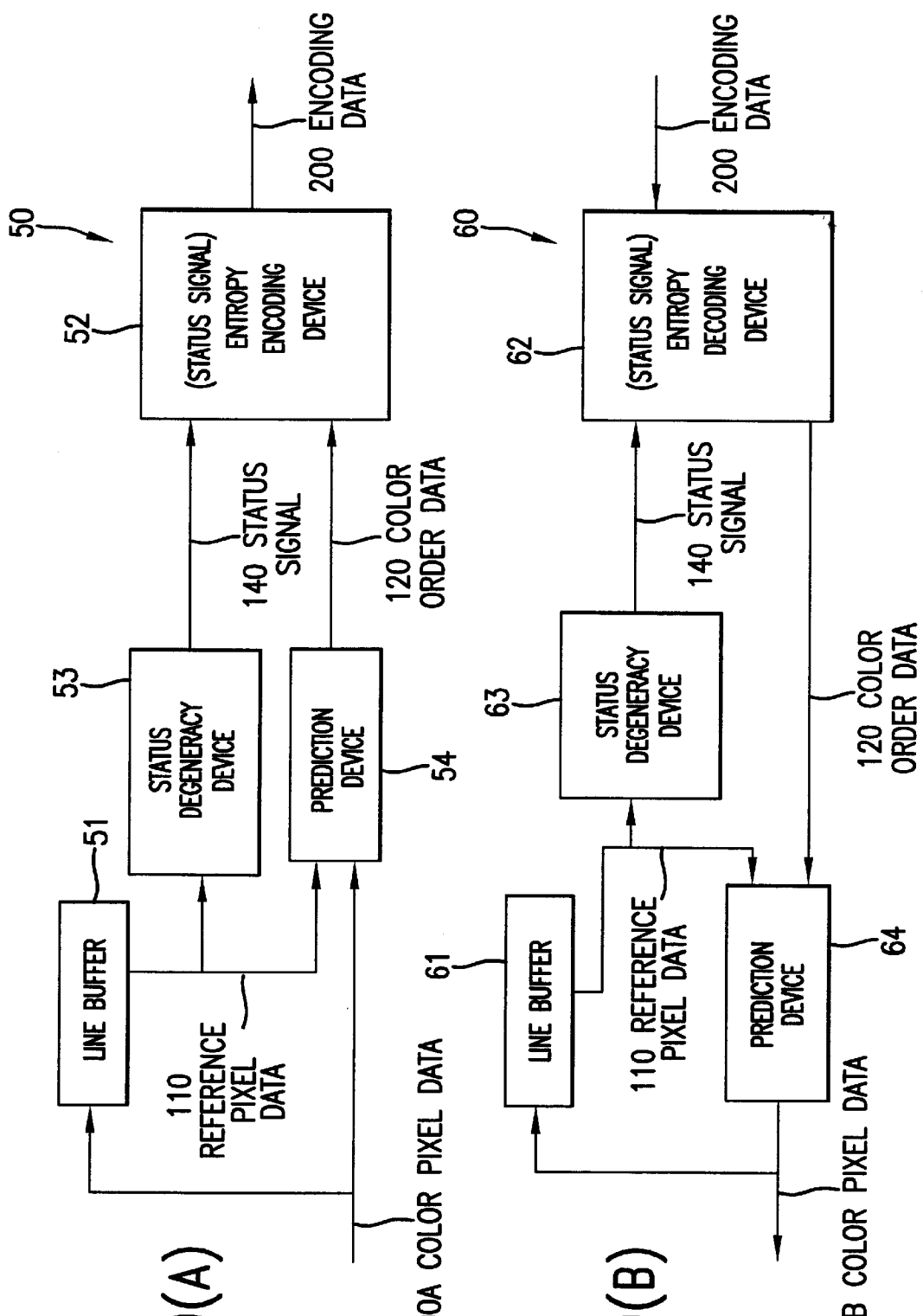

|   |   |
|---|---|
| C | B |
| A | X |

X : ENCODING TARGET PIXEL

A,B,C : REFERENCE PIXELS

FIG.20(A)

| CONDITION | Sx |
|---|---|
| A = B = C | S1 |
| A = B ≠ C | S2 |
| A = C ≠ B | S3 |
| A ≠ B = C | S4 |
| A ≠ B ≠ C | S5 |

FIG.20(B)

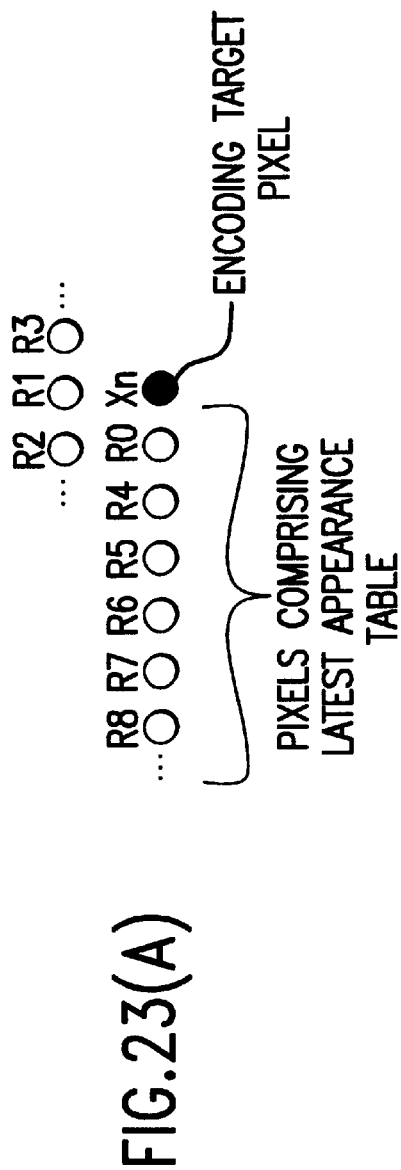

LATEST APPEARANCE
TABLE

| COLOR ORDER | COLOR SYMBOL |
|---|---|
| 1st ORDER | C4 |
| 2nd ORDER | C3 |
| 3rd ORDER | C6 |
| 4th ORDER | C5 |
| 5th ORDER | C2 |
| 6th ORDER | C0 |
| 7th ORDER | C8 |
| ⋮ | |
| 16th ORDER | Cn |

FIG.23(C)

MULTI-COLOR IMAGE ENCODING APPARATUS AND METHOD, MULTI-COLOR IMAGE DECODING APPARATUS AND METHOD

BACKGROUND OF THE INVENTION

1. Field of Invention

The present invention relates to a multi-color image encoding and/or apparatus and its method. More particularly, the present invention relates to partitioning target pixels during encoding and decoding a multi-color image.

2. Description of Related Art

Multi-color images have been used in personal computers, game machines and the like. A multi-color image is also called a representative color image or a limited color image. As shown in FIG. 22, a multi-color image is an image in which an index is attached to a specific color, namely a color having a specific R(red), G(green) and B(blue) value, and using the index data to express the image by limited representative colors consisting of 16, 256 colors.

This type of multi-color image data requires a total of 24 bits assuming that each of R, G, and B color is displayed by 8 bits (256 types). However, because an index is also displayed by 8 bits, the data compression rate is substantial. Despite the compression, the information volume is still very large, which makes the communication of data too slow to be practical if the data is processed without any change. Hence, compression technology of multi-color images is extremely important. A multi-color image requires encoding and decoding compression technology (i.e., a reversible compression technology) without loss because the number of colors is limited for a multi-color image.

A technology based on an entropy encoder and decoder has drawn attention in recent years as one type of data compression technique. An example of such is a technology which uses an arithmetic encoding and decoding technology. Synopsis of this technology is described in Japanese Laid-Open Patent Publication 62-185413, Japanese Laid-Open Patent Publication 63-74324 and Japanese Laid-Open Patent Publication 63-76525, the subject matters of which are incorporated herein by reference.

FIGS. 16(A)–(B) show a conventional multi-color encoding system 50 and decoding system 60 which use the above technology. The encoding system 50 includes a line buffer 51 and an entropy encoder 52. Color pixel data 100A is input to the line buffer 51 and the entropy encoder 52. All the color pixel data 100A (shown in FIG. 17) is raster scanned and sequentially input as pixel data in the order of horizontal scanning. A method of attaching an index in the order of the input color is used as a method to form the index data (i.e., the color pixel data 100A) which creates a phenomena such that the colors are substantially different for data with close index such as "1" and "2" or that the colors are quite close for the data with large differences in index such as "100" and "200" as shown in FIG. 22. A method to avoid such phenomena by attaching successive numbers to similar colors is disclosed in Japanese Laid-Open Patent Publication 5-328142, the subject matter of which is incorporated herein by reference.

The line buffer 51 is a reference pixel generation device that generates reference pixel data A, B, C and D for encoding the target pixel X (from the input color pixel data 100A). In other words, the line buffer 51 stores the chronology of n lines (usually 1 to 5 lines) when scanning the image. Moreover, each time the color pixel data 100A is input, the line buffer 51 outputs a series of pixel data to the entropy encoding device 52 consisting of the most recently input pixel A and surrounding pixels B, C and D as reference pixel data 110.

The entropy encoding device 52 uses an arithmetic encoding or Huffman encoding technique. The entropy encoder 52 uses the reference pixel data 110 as status signals, transforms the color pixel data 100A into encoding data 200 and outputs the same.

On the other hand, the decoding system 60 includes a line buffer 61 and an entropy decoder 62. The line buffer 61 and the entropy decoder 62 are created such that the input encoding data 200 is decoded and output through a reverse procedure than that taken by the line buffer 51 and the entropy encoder 52 of the encoding system 50.

The encoding system 50 and the decoding system 60 use completely reversible algorithms to encode the color pixel data 100A into encoding data 200, and to decode the encoding data 200 into the color pixel data 100B. This system is widely used in a variety of applications.

However, when the value or index number of the color pixel data 100A approaches a certain number, the data compression rate improves. The reference pixel data 110 is used as a status signal of the entropy encoder 52 and the entropy decoder 62. Hence, by taking a large number of status numbers (i.e., the reference pixel data) the data compression rate improves. In other words, in structuring the entropy encoder 52 and the entropy decoder 62 using an arithmetic encoding or Huffman encoding technique, the data compression rate may be drastically improved by making large disparity in the occurrence probabilities of the symbols 0 or 1. This is because the entropy encoding technique assigns short encoding data to input data with a high occurrence probability while it assigns relatively long encoding data to input data with a low occurrence probability.

In order to obtain large disparity in the occurrence probability of symbols (i.e., index numbers) a method has been used in which the input data is classified into several statuses and encoded. This is because an improved compression rate is not obtained unless the data is classified. For example, in a conventional technology such as shown in FIGS. 16(A)–(B), reference pixel data is created using the line buffers 51, 61 and is input in the entropy encoder 52 and the entropy decoder 62 as status signals to be used for classification. The entropy encoder 52 and the entropy decoder 62 classify the input data using the status signals and execute encoding and/or decoding. In other words, the entropy encoder 52 and the entropy decoder 62 compute the occurrence probability of each state of the reference pixel data and assign short encoding data to the combination of data with the higher occurrence probability. This improves the data compression rate.

However, a number of encoding parameter tables corresponding to the number of status of the reference pixel data is necessary for the entropy encoder 52 and the entropy decoder 62. The larger the number of reference pixel data, the larger the parameter tables for encoding and decoding. Hence, the entropy encoder 52 and the entropy decoder 62 become large in size and more expensive.

For example, suppose that the color pixel data, namely, the index number includes a 4 bit data (16 types), and the number of pixels of the reference pixel data 110 is four. In this case, the number of status of the encoding and the decoding parameter tables becomes 4 pixels×4 bit=16 status per bit, namely $2^{16}$ numbers of status. Hence, a parameter table for $2^{16}$=65536 entries must be prepared. This shows that an increase in reference pixels results in a large number of encoding and decoding tables which causes the hardware (i.e., the entropy encoder 52 and the entropy decoder) to become large. Moreover, because the target pixel is composed of 4 bits, and because a one bit signal is assigned to each plane, resulting in 16 entries of colors for 4 bits, which in turn requires the parameter table to become a table of 65536×16 as shown in FIG. 18.

Japanese Laid-Open Patent Publication 6-276041, the subject matter of which is incorporated herein by reference, describes a method of color order transformation in which the disparity of occurrence frequency of color symbols for the target pixel is computed and the index number is rearranged corresponding to the occurrence frequency order. The compression rate is further increased by assigning a short encoding data to the index number with a high occurrence frequency. Japanese Laid-Open Patent Publication 6-276041 also discloses a technology in which a parameter table is made smaller in the entropy encoder 52 and the entropy decoder 62 according to the degenerated status number.

FIGS. 19(A)–(B) show the system of degenerating the number of status disclosed in Japanese Laid-Open Patent Publication 6-276041 where the status signal 140 is generated by the status degenerating equipment 53, 63 which degenerates the reference pixel data 110 being output from the line buffer when the reference pixel data 110 is input as the status signal into the entropy encoder 52 and the entropy decoder 62. This input is the same as in the conventional encoding system 50 and decoding system 60.

The status degenerating equipment 53, 63 is composed such that the input reference pixel data 110 is degenerated to the status signal 140 with less bits and is output to the corresponding entropy encoder 52 and entropy decoder 62. A prediction device 54, 64 contains a color order table in its memory for transforming the color pixel data to color order (or reverse of color order) based on the occurrence frequency of each color symbol.

Degeneracy refers to classifying the original status into the number of status after the degeneration. This classification is executed by selecting the combinations such that the entropy (i.e., average information amount to display one symbol) after classification is at a minimum. Moreover, an identification bit is attached to the number of status after degeneration, i.e., after classification. This is the status signal 140.

In one method in which a degeneracy table specifying a relationship between a combined pattern of the color symbol of the reference pixel data 110 and the degeneracy data is established as a degeneracy table to be used in the status degenerating equipment 53, 63. The degeneracy table is used to transform and output the combination pattern of the color symbol of the reference pixel data being input as degenerated data.

FIGS. 20(A)–(B) show an example of a degeneracy operation using such method. For simplicity, an example of a Markov model created by three pixels A, B, C for encoding target pixel X is used as a reference pixel pattern.

If the reference pixel pattern includes three pixels as in FIG. 20(A), the combination pattern of the color symbol has five possibilities as shown in FIG. 20(B). In other words, patterns are classified into five patterns, namely a pattern in which all the color symbols of three pixels coincide, three patterns in which only two color symbols coincide and a pattern in which color symbols of all three pixels are different.

Using the FIG. 20(B) table as a degeneracy table of status degenerating equipment 53, 63, the $2^{12}$ patterns which are the number of possible combinations of the original three pixels is degenerated to five status S1–S5 as shown in FIG. 20(B). As a result, the reference pixel data 110 is effectively degenerated and the number of status of the entropy encoder 52 and the entropy decoder 62 is substantially reduced.

A method for such arithmetic encoding and decoding is already disclosed in one pixel encoding standard JBIG (International Standard ISO/IEC 11544), pp. 26–44 and pp. 44–50, the subject matter of which is incorporated herein by reference.

An example of an arithmetic encoding type entropy encoder 52 (FIG. 16) is shown in FIG. 21. The structure of an arithmetic decoding type entropy decoder 62 is substantially the same as the structure of the entropy encoder 52.

The entropy encoder 52 contains an arithmetic algorithm unit 55 and an occurrence probability generation device 56 which functions as a status memory. A status parameter table needed for determining symbol generation probability to be used for encoding is in the occurrence probability generation device 56. The status parameter is specified by the input status symbol. Moreover, the occurrence probability algorithm parameter of the occurrence probability generation device 56 is output to the arithmetic algorithm unit 55 for the table of the status parameter specified by the status symbol. Based on the input occurrence probability, the arithmetic algorithm unit 55 executes entropy encoding and transforms and outputs the color order data 120 as encoding data 200. Moreover, the arithmetic algorithm unit 55 computes the occurrence probability for the status symbol using the value of encoded color order 120, and inputs an algorithm update value to the occurrence probability generation device 56. Storing of the update result as occurrence probability of the next date improves the compression efficiency of the entropy encoder 52.

In order to generate the color order table 120, a color order table is arranged in the prediction devices 54, 64 as described above. FIGS. 23(A)–(C) are an example of an well known color table (see Japanese Laid-Open Patent Publication 6-276041). In determining the color order table for the encoding target pixel X, two-dimensional perimeter data R0, R1, R3, R3 are used as upper color order data, and a one-dimensional table in the same line as the encoding target pixel X is used as lower color order data. First, the color symbols of the perimeter pixel data R0, R1, R2, R3 are deleted from the one-dimensional table, then the upper color order and lower color order are combined to form a color order table of the target pixel X.

The process of forming the color order table is shown in FIGS. 23(A)–(C). A case in which the color symbols are to be encoded will be described. When the color order is fixed by the position of each pixel R0, R1, R2, . . . R8 . . . as shown in FIG. 23(A) and each color symbol becomes C4, C3, C6, C5, C2, C2 . . . as shown in FIG. 23(B), the resulting color table, which is the latest appearance table, becomes the table shown in FIG. 23(C). In other words, the uppermost line becomes C4 for R0, the second order is C3 for R1, the third order is C6 for R2, the fourth order is C5 for R3, the fifth order is C2 for R4, and the sixth order is C2 for R5. However, because C2 already occurs as well as C4 for R6, the sixth order becomes C0 for R7. In this manner, the color order data from which the colors which are already in upper order (i.e., color symbols that appear in R0–R3) is added to the data of R0–R3 and the first to 16th of 16 color symbols are determined. The upper four perimeter pixels may be made variable through learning.

To create the color order table used for transformation of two-dimensional color order shown in FIG. 23, a deleting operation to delete color symbols overlapping in the two-dimensional perimeter data and the one-dimensional table becomes necessary. The process of deleting overlapping color symbols from the one-dimensional table involves vast amounts of processing when the number of bits of the color symbol index code increases. If the total number of color symbols is 16, or equivalently if 4 bits is sufficient for the index code, the process of searching the overlapping color symbols and deleting from the color symbols from the one-dimensional table is not much burden, but if the index code becomes 8 bits then the total number of color symbols becomes 256. Then, the process of searching and deleting overlapping color symbols become enormous.

If the colors of the perimeter pixel data R0, R1, R2 R3 are all different, each color is searched from 256 colors in the one-dimensional table in order to delete whenever the same color symbol is found and to move up the subsequent order with the last color symbol being assigned to the 256th order. To accomplish this, up to 256×4 comparisons may be made.

Moreover, in a color order table comprising only the one-dimensional table (including the color order table shown in FIG. 23) or the one-dimensional table shown in FIG. 45 of Japanese Laid-Open Patent Publication 6-276041, a latest appearance table is created or a move-to-front process is executed using a FIFO having a plurality of registers. The amount of processing for creating the latest appearance table increases due to an increase in the amount of algorithm caused by an increase in number of bits in the index code. In dealing with the index codes with large numbers of bits, the process speed declines during multi-color image encoding or decoding.

Moreover, the line buffer 51 (of the encoding system 50) and the line buffer 61 (of the decoding system 60) shown in FIGS. 16 and 19 store a large number of pixels in order to generate reference pixels and perimeter pixels. Hence, the line buffers 51, 61 become large in size, causing the system to become large and expensive. Moreover, conventional apparatus shown in FIGS. 16 and 19 compress and decode by fixing the length in the direction of the horizontal width of the image, which makes it difficult to efficiently compress and decode image with an arbitrary size.

SUMMARY OF THE INVENTION

The present invention resolves the problems described above and provides a multi-color image encoding and/or apparatus and its method which substantially improves the process speed by drastically reducing a sorting algorithm in executing the move-to-front process (i.e., the latest appearance table creation process). Furthermore, the present invention provides a multi-color image encoding apparatus capable of using a perimeter pixel creation device, such as low capacity line buffer, during encoding and decoding. Moreover, the present invention provides a multi-color image encoding apparatus capable of efficiently encoding and decoding a multi-color image with arbitrary image size.

A multi-color image encoding apparatus may be provided having a prediction device with a color order table in which the color order of each color symbol is established for reading and outputting the color order of the color symbol corresponding to target color pixel data to which an index code consisting of a plurality of bits is attached from the color order table. A perimeter pixel generation device may output two-dimensional perimeter pixel data for the target color pixel data based on the input color pixel data. An entropy encoding device transforms and outputs the color order data as encoded data. The color order table is created by combining a two-dimensional color order table, which establishes the color order for the color symbols of each pixel of the two-dimensional perimeter pixel data, and a one-dimensional color order table for the lower color order which establishes a predetermined number of color orders for the color symbols corresponding to the color pixel data which is input ahead of the target color pixel data. The color order table may be generated by creating a latest appearance table that moves the color order of the color symbols corresponding to the input color pixel data from the latest to the uppermost line. A strip creation device partitions the target image to be encoded into strips with the horizontal width consisting of a limited number of pixels inside of which the strip is encoded successively.

By partitioning the target image into strips with the horizontal width consisting of a limited number of pixels, the color symbols in the one-dimensional color order table overlapping the two-dimensional color order table may be limited to the horizontal width of the strip. Hence, by deleting the overlapping color symbols from the one-dimensional color table, the search operation may be substantially reduced. Moreover, if the overlapping color symbols are not deleted, the creation speed of the one-dimensional color order table is increased during decoding by a reverse algorithm of encoding, which results in an encoding system capable of high speed process during decoding. Furthermore, the capacity of a perimeter pixel generation device (such as line buffer) that creates perimeter pixels may be reduced, which results in a smaller and less expensive system.

A multi-color image encoding apparatus may include a prediction device with a color order table in which the color order of each color symbol is established for reading and outputting the color order of the color symbol corresponding to the target color pixel data to which an index code consisting of a plurality of bits is attached from the color order table. A perimeter pixel generation device may output the two-dimensional perimeter pixel data for the target color pixel data based on the input color pixel data. An entropy decoding device may transform and output the color order data into encoding data. The color order table may be created by combining a two-dimensional color order table, which establishes the color order for the color symbols of each pixel in the two-dimensional perimeter pixel data, and a one-dimensional color order table for the lower color order which establishes a predetermined number of color orders for the color symbols corresponding to the color pixel data which is input ahead of the target color pixel data. The color order table may be generated by creating a latest appearance table that moves the color order of the color symbols corresponding to the input color pixel data from the latest to the uppermost line. When color symbols in the two-dimensional color order table overlap with color symbols in the one-dimensional color order table, the overlapped color symbols are not deleted from the one-dimensional color table but remain without change in the one-dimensional color order table. A strip creation device may partition the target image into strips with the horizontal width consisting of a limited number of pixels, inside of which the strip is successively encoded.

In this manner, even when color symbols overlap, the color order table is created without deleting color symbols. As a result, the algorithm is drastically reduced, which substantially improves the encoding process speed. Moreover, by partitioning the target image into strips with the horizontal width consisting of a limited number of pixels, the searching operation of overlapping color symbols from the one-dimensional color order table during decoding using a reverse encoding algorithm is drastically reduced. This results in high speed creation of the latest one-dimensional color order table and achieves an encoding system capable of high speed processing during decoding.

Furthermore, when the target color pixel data is encoded using the two-dimensional perimeter pixels, the position of each perimeter pixel is determined by the scanning distance from the target color pixel. Because the position of the perimeter pixel is regarded in terms of a one-dimensional distance rather than of a two-dimensional fixed position, moving from one strip to the next is a normal process.

The horizontal width of the strip may include 16–32 pixels, which drastically increases the process speed without reducing the compression efficiency during the time of using the perimeter pixels.

When the target color pixel data is encoded using Markov model reference pixels, the position of each reference pixel is determined by the scanning distance from the target color pixel.

Hence, when a process which uses a Markov model is executed, high speed operation may be achieved without decreasing the compression rate.

Moreover, if the horizontal width of the target image is not evenly divisible by the horizontal width of the strip and if the number of pixels in the horizontal width of the last strip is n, then a strip with arbitrary horizontal width is handled by assuming the perimeter pixel that is just prior to the encoding target pixel, assuming that the pixels on one line to be n prior pixels, assuming that the pixel which is one advanced pixel to be (n−1) prior pixel, assuming that the pixel which is one prior to the pixels on one line to be (n+1) prior pixel, and by executing an exception process on the perimeter pixel which adopts one prior pixel when the value of (n−1) is 1 or less. Processing of the perimeter pixels becomes easily executable for a strip with arbitrary horizontal width and the encoding efficiency improves.

A strip with an arbitrary horizontal width may be handled by executing a process similar to the exception process of the perimeter pixel for the last strip as the reference pixel. In order not to make one prior pixel of the encoding target pixel to be the reference pixel, the two prior pixels may be the reference pixel when the values of n and (n−1) are 1 or less. Hence, processing of the reference pixels becomes simply executable for a strip with arbitrary horizontal width. Furthermore, one prior pixel is never used as a reference pixel, which substantially increases the encoding speed.

Furthermore, when target color pixel data are encoded and output as encoding data, a strip creation device may be provided for partitioning the target image into strips with the horizontal width consisting of a limited number of pixels, inside of which the strip is encoded successively.

Because the target image is partitioned into strips with the horizontal width of a limited number of pixels, the circuit size and memory amount of the perimeter pixel generation device and the reference pixel generation device (such as line buffer) is reduced. As a result, the system may be made smaller and less expensive.

In a multi-color image encoding method, a prediction step may be provided with a color order table in which the color order of each color symbol is established for reading and outputting the color order of the color symbol corresponding to target color pixel data to which an index code consisting of a plurality of bits is attached from the color order table.

A perimeter pixel generation step may be provided for outputting two-dimensional perimeter pixel data for the target color pixel data based on the input color pixel data. An entropy encoding step may be provided for transforming and outputting the color order data into encoding data. A color order table may be created by combining a two-dimensional color order table, which establishes the color order for the color symbols of each pixel of the two-dimensional perimeter pixel data, and a one-dimensional color order table for lower color order which establishes a predetermined number of color orders for the color symbols corresponding to the color pixel data which is input ahead of the target color pixel data. The color order table is generated by creating a latest appearance table that moves the color order of the color symbols corresponding to the color pixel data being input from the latest to the uppermost line. A strip creation step may be provided for partitioning the target image into strips with the horizontal width consisting of a limited number of pixels, inside of which the strip is successively encoded.

By partitioning the target image into strips with the horizontal width consisting of a limited number of pixels, the color symbols in the two-dimensional color order table overlapping the one-dimensional color order table may be limited to the horizontal width of the strip. Hence, by deleting the overlapping color symbols from the one-dimensional color table, the search operation may be substantially reduced. Moreover, if the overlapping color symbols are not deleted, the time to create the one-dimensional color order table may be increased during decoding by a reverse encoding algorithm, which results in an encoding system capable of high speed decoding. Furthermore, the capacity of a perimeter pixel generation device (such as line buffer) which creates perimeter pixels may be reduced, which results in a smaller and less expensive system when this method is embodied as a system.

A prediction step may be provided with a color order table in which the color order of each color symbol is established for reading and outputting the color order of the color symbol corresponding to target color pixel data to which an index code consisting of a plurality of bits is attached from the color order table. A perimeter pixel generation step may be provided for outputting two-dimensional perimeter pixel data for the target color pixel data based on the input color pixel data. An entropy decoding step may be provided for transforming and outputting the color order data into encoding data. The color order table may be created by combining a two-dimensional color order table which establishes the color order for the color symbols of each pixel of the two-dimensional perimeter pixel data and a one-dimensional color order table of lower color order which establishes a predetermined number of color orders for the color symbols corresponding to the color pixel data which is input ahead of the target color pixel data and which is generated by creating the latest appearance table that moves the color order of the color symbols corresponding to the input color pixel data from the latest to the uppermost line. When color symbols in the two-dimensional color order table and color symbols in the one-dimensional color order table overlap, the overlapped color symbols are not deleted from the one-dimensional color table but rather remain without change in the one-dimensional color order table. A strip creation step may be provided for partitioning the target image into strips with the horizontal width consisting of a limited number of pixels, inside of which the strip is successively encoded.

Even when color symbols overlap, the color order table may be created without deleting the color symbols. As a result, the encoding algorithm is drastically reduced, which substantially improves process speed. Moreover, by partitioning the target image into strips with the horizontal width consisting of a limited number of pixels, a searching operation of the overlapping color symbols from the one-dimensional color order table during decoding using a reverse encoding algorithm is drastically reduced. This results in high speed creation of the latest one-dimensional color order table and achieves an encoding system capable of high speed decoding.

In addition, when the input target color pixel data is encoded using the two-dimensional perimeter pixels, the position of each perimeter pixel is determined by the scanning distance from the target color pixel. Hence, because the position of the perimeter pixel is a one-dimensional distance rather than a two-dimensional fixed position, moving from one strip to the next is a normal process requiring no special processing.

The horizontal width of the strip may include 16–32 pixels, which drastically increases the process speed without reducing the compression efficiency during the time of using the perimeter pixels.

Furthermore, when the target color pixel data is encoded using Markov model reference pixels, the position of each reference pixel is determined by the scanning distance from the target color pixel. Hence, when a process which uses a Markov model is executed, a high speed operation may be achieved without significantly decreasing the compression rate.

Moreover, if the horizontal width of the target image is not evenly divisible by the horizontal width of the strip and if the number of pixels in the horizontal width of the last strip is n, then a strip with an arbitrary horizontal width may be handled by assuming the perimeter pixel that is one before the encoding target pixel is the pixel being input one before, assuming that the pixels on one line to be n prior pixels, assuming that the pixel which is one advanced pixel to be (n−1) prior pixel, assuming that the pixel which is one prior to the pixels on one line to be (n+1) prior pixel, and by executing an exception process on the perimeter pixel which adopts one prior pixel when the value of (n−1) is 1 or less. Hence, processing of the perimeter pixels becomes easily executable for a strip with arbitrary horizontal width and the encoding efficiency improves.

Moreover, when a strip with arbitrary horizontal width is handled by executing a process similar to the exception process of the perimeter pixel for the last strip as the reference pixel and in order not to make one prior pixel of the encoding target pixel to be the reference pixel, the two prior pixels may be the reference pixel when the values of n and (n−1) is one or less. Hence, processing of the reference pixels becomes simply executable for a strip with arbitrary horizontal width. Furthermore, one prior pixel is never used as a reference pixel and the encoding speed is substantially increased.

Furthermore, when target color pixel data are encoded and output as encoding data, a strip creation step may be provided for partitioning the target image into strips with the horizontal width consisting of a limited number of pixels, inside of which the strip is encoded successively.

Because the target image is partitioned into strips with the horizontal width of a limited number of pixels, the circuit size and memory amount of the perimeter pixel generation step and the reference pixel generation step may be reduced. As a result, the system may be made smaller and less expensive when the method is embodied as a system.

In a multi-color image decoding apparatus, an entropy decoding device may transform and output the target encoding data as the color order data. A prediction device may be provided with a color order table in which the color order of each color symbol is established for reading and outputting color symbols from the color order table corresponding to the input color order data as the target color pixel data of a plurality of bits. The prediction device and a perimeter pixel generation device may output two-dimensional perimeter pixel data for the target color pixel data based on the color pixel data being decoded. The color order table may be a table created by combining a two-dimensional color order table which establishes the color order for the color symbols of each pixel of the two-dimensional perimeter pixel data and a one-dimensional color order table of lower color order which establishes a predetermined number of color orders for the color symbols corresponding to the color pixel data which is output ahead of the target color pixel data and which is generated by creating the latest appearance table that moves the color order of color symbols specified by the input color order from the latest to the uppermost line. The target encoding data may be decoded and output as color pixel data using the color order data corresponding to the target encoding data. A strip combination device may partition and decode the target image to be decoded into strips with the horizontal width consisting of a limited number of pixels and may successively decode in strips.

By partitioning the target image into strips with the horizontal width consisting of a limited number of pixels, the color symbols in the one-dimensional color order table overlapping the two-dimensional color order table may be limited to the horizontal width of the strip. Hence, by deleting the overlapping color symbols from the one-dimensional color table, the search operation may be substantially reduced. Moreover, if the overlapping color symbols are not deleted, the time for creating the one-dimensional color order table may be increased during decoding, which results in a system capable of high speed decoding. Furthermore, the capacity of a perimeter pixel generation device (such as line buffer) which creates perimeter pixels may be reduced to result in a smaller and less expensive system.

An entropy decoding device may be provided for transforming and outputting the target encoding data as the color order data. A prediction device with a color order table in which the color order of each color symbol is established may be provided for reading and outputting color symbols from the color order table corresponding to the color order data being input as the target color pixel data of a plurality of bits. A prediction device and a perimeter pixel generation device may be provided for outputting two-dimensional perimeter pixel data for the target color pixel data based on the color pixel data being decoded. The color order table may be a table created by combining a two-dimensional color order table which establishes the color order for the color symbols of each pixel of the two-dimensional perimeter pixel data and a one-dimensional color order table for lower color order which establishes a predetermined number of color orders for the color symbols corresponding to the color pixel data which is output ahead of the target color pixel data and which is generated by creating the latest appearance table that moves the color order of color symbols specified by the color order being input from the latest to the uppermost line. The target encoding data may be decoded and output as color pixel data using the color order data corresponding to the target encoding data. When color symbols in the two-dimensional color order table and color symbols in the one-dimensional color order table overlap, the overlapped color symbols are not deleted from the one-dimensional color table but rather remain without change in the one-dimensional color order table. A strip combination device may be provided for partitioning and decoding target image to be decoded into strips with the horizontal width consisting of a limited number of pixels and for successively decoding in strips.

Even when color symbols overlap, the color order table may be created without deleting the color symbols. As a result, the algorithm is drastically reduced, which substantially improves the process speed during decoding. Moreover, by partitioning the target image into strips with the horizontal width consisting of a limited number of pixels, the operation to search the overlapping color symbols from the one-dimensional color order table during decoding is drastically reduced, which results in high speed creation of the latest one-dimensional color order table. Hence, a decoding system capable of high speed processing during decoding is achieved.

Furthermore, target encoding data may be decoded and output as decoding data. A strip combination device may partition the target image to be decoded into strips with the horizontal width consisting of a limited number of pixels and may successively decode in strips.

Because the target image is partitioned into strips with the horizontal width consisting of a limited number of pixels, the circuit size and memory amount of the perimeter pixel generation device and the reference pixel generation device (such as line buffer) may be reduced. As a result, the system may be made smaller and less expensive.

In a multi-color image decoding method, an entropy decoding step may be provided for transforming and outputting the target encoding data. A prediction step may be provided with a color order table in which the color order of each color symbol is established for reading and outputting from the color order table color symbols corresponding to the input color order data as the target color pixel data composed of a plurality of bits. The prediction step and a perimeter pixel generation step may be provided for outputting two-dimensional perimeter pixel data for the target color pixel data based on the color pixel data being decoded. The color order table may be a table created by combining a two-dimensional color order table which establishes the color order for the color symbols of each pixel of the two-dimensional perimeter pixel data and a one-dimensional color order table of lower color order which establishes a predetermined number of color orders for the color symbols corresponding to the color pixel data which is output ahead of the target color pixel data and which is generated by creating the latest appearance table that moves the color order of color symbols specified by the input color order from the latest to the uppermost line. The target encoding data may be decoded and output as color pixel data using the color order data corresponding to the target encoding data. A strip decoding step may be provided for partitioning and decoding the target image into strips with the horizontal width consisting of a limited number of pixels and may successively decode in strips.

By partitioning the target image into strips with the horizontal width consisting of a limited number of pixels, the color symbols in the one-dimensional color order table overlapping the two-dimensional color order table may be limited to the horizontal width of the strip. Hence, by deleting the overlapping color symbols from the one-dimensional color table, the search operation may be substantially reduced. Moreover, if the overlapping color symbols are not deleted, the speed of creating the one-dimensional color order table may be increased during decoding, which results in a decoding system capable of high speed decoding. Furthermore, the capacity of a perimeter pixel generation device (such as line buffer) which creates perimeter pixels may be reduced, which results in a smaller and less expensive system when the method is embodied as a system.

An entropy decoding step may be provided for transforming and outputting the target encoding data. A prediction step may be provided with a color order table in which the color order of each color symbol is established for reading and outputting, from the color order table, color symbols corresponding to the input color order data as the target color pixel data. The prediction step and a perimeter pixel generation step may be provided for outputting two-dimensional perimeter pixel data for the target color pixel data based on the color pixel data being decoded. The color order table may be a table created by combining a two-dimensional color order table which establishes the color order for the color symbols of each pixel of the two-dimensional perimeter pixel data and a one-dimensional color order table of lower color order which establishes a predetermined number of color orders for the color symbols corresponding to the color pixel data which is output ahead of the target color pixel data and which is generated by creating the latest appearance table that moves the color order of color symbols specified by the color order being input from the latest to the uppermost line. The target encoding data may be decoded and output as color pixel data using the color order data corresponding to the target encoding data. When color symbols in the two-dimensional color order table overlap color symbols in the one-dimensional color order table, the overlapped color symbols are not deleted from the one-dimensional color table but rather remain without change in the one-dimensional color order table. A strip decoding step may be provided for partitioning and decoding target image into strips with the horizontal width consisting of a limited number of pixels and may be provided for successively decoding in strips.

Even when color symbols overlap, the color order table may be created without deleting the color symbols. As a result, the algorithm is drastically reduced, which substantially improves process speed during decoding. Moreover, by partitioning the target image into strips with the horizontal width consisting of a limited number of pixels, the operation to search the overlapping color symbols from the one-dimensional color order table during decoding is drastically reduced, which results in high speed creation of the latest one-dimensional color order table. Hence, a decoding system capable of high speed decoding is achieved.

In addition, target color pixel data may be decoded and output as decoding data. A strip decoding step may be provided for partitioning and decoding target image into strips with the horizontal width consisting of a limited number of pixels and for decoding successively in strips.

Because the target image is partitioned into strips with the horizontal width consisting of a limited number of pixels in this manner, the circuit size and memory amount of the perimeter pixel generation step and the reference pixel generation step such as line buffer may be reduced. As a result, the system may be made smaller and less expensive when the method is embodied as a system.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIG. 6 shows the two-dimensional color order table employed in the encoding system and decoding system;

FIG. 7 shows the one-dimensional color order table employed in the encoding system and decoding system;

FIG. 8 shows the combined color order table employed in the encoding system and decoding system;

FIG. 12(B) shows encoding when the encoding target pixel has arrived at the end of the second line, and FIG. 12(C) shows encoding when the encoding target pixel has arrived at the first part of the neighboring strip;

FIGS. 14(A)–(C) show handling of the perimeter pixels used by the two-dimensional color order table and the reference pixels used by the Markov model in the encoding action of the encoding system with FIG. 14(A) showing the horizontal width is 3 pixels, FIG. 14(B) showing when the horizontal width is 2 pixels, and FIG. 14(C) showing when the horizontal width is 1 pixel;

FIGS. 16(A)–(B) show a conventional multi-color image encoding system and decoding system;

FIG. 18 shows a conventional parameter table;

FIGS. 19(A)–(B) show a conventional multi-color image encoding system and decoding system having a status degeneracy device;

FIGS. 20(A)–(B) show a conventional degeneracy table;

FIGS. 23(A)–(C) show the conventional combined color order table creation principle with FIG. 23(A) showing the relationship of each pixel, FIG. 23(B) showing the color symbol of each pixel and FIG. 23(C) showing the combined color order table (latest appearance table).

DETAILED DESCRIPTION OF PREFERRED EMBODIMENTS

Figure 1:
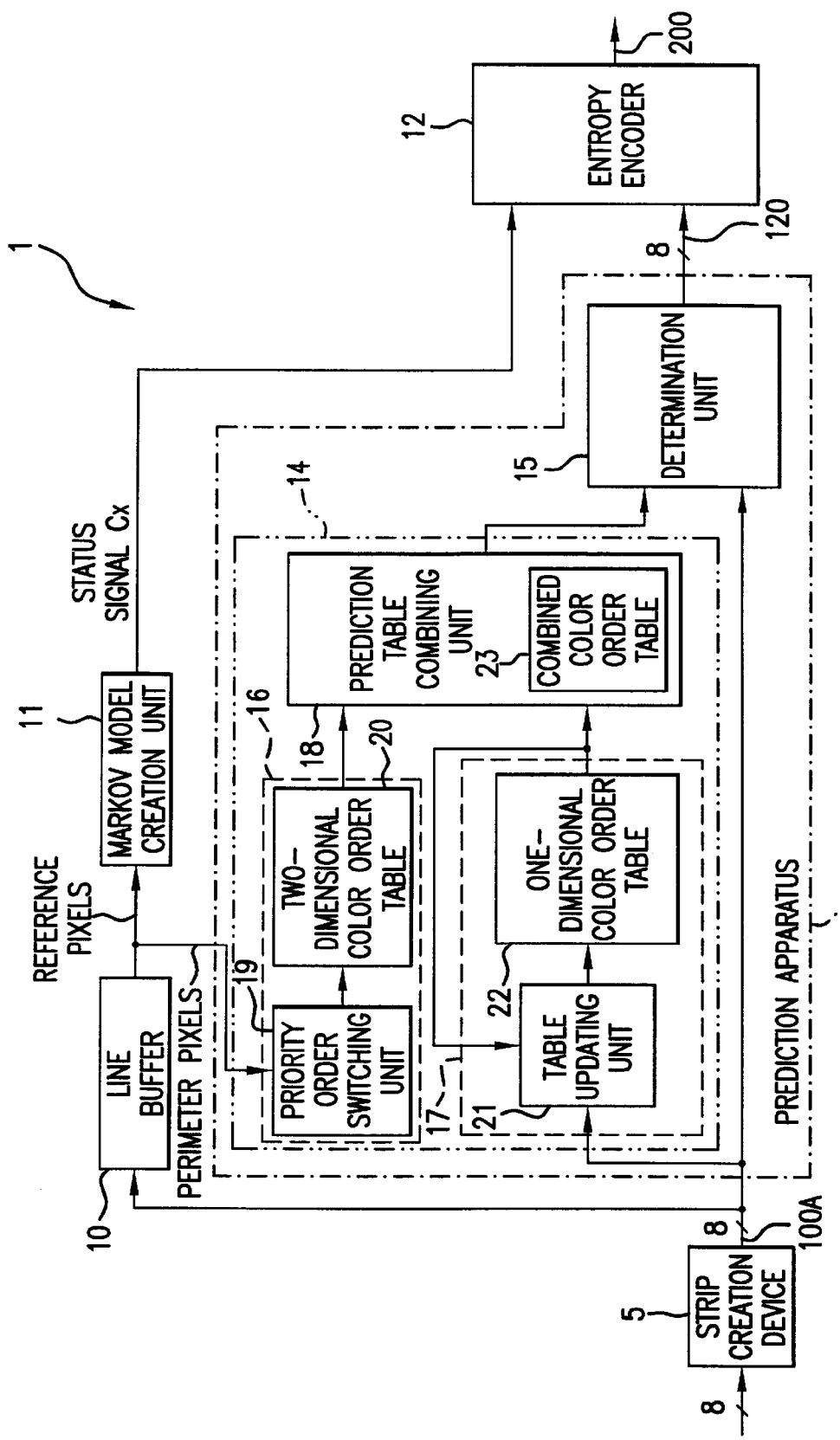
FIG. 1 shows an encoding system utilizing the multi-color image encoding apparatus and method according to the present invention.
Figure 2:
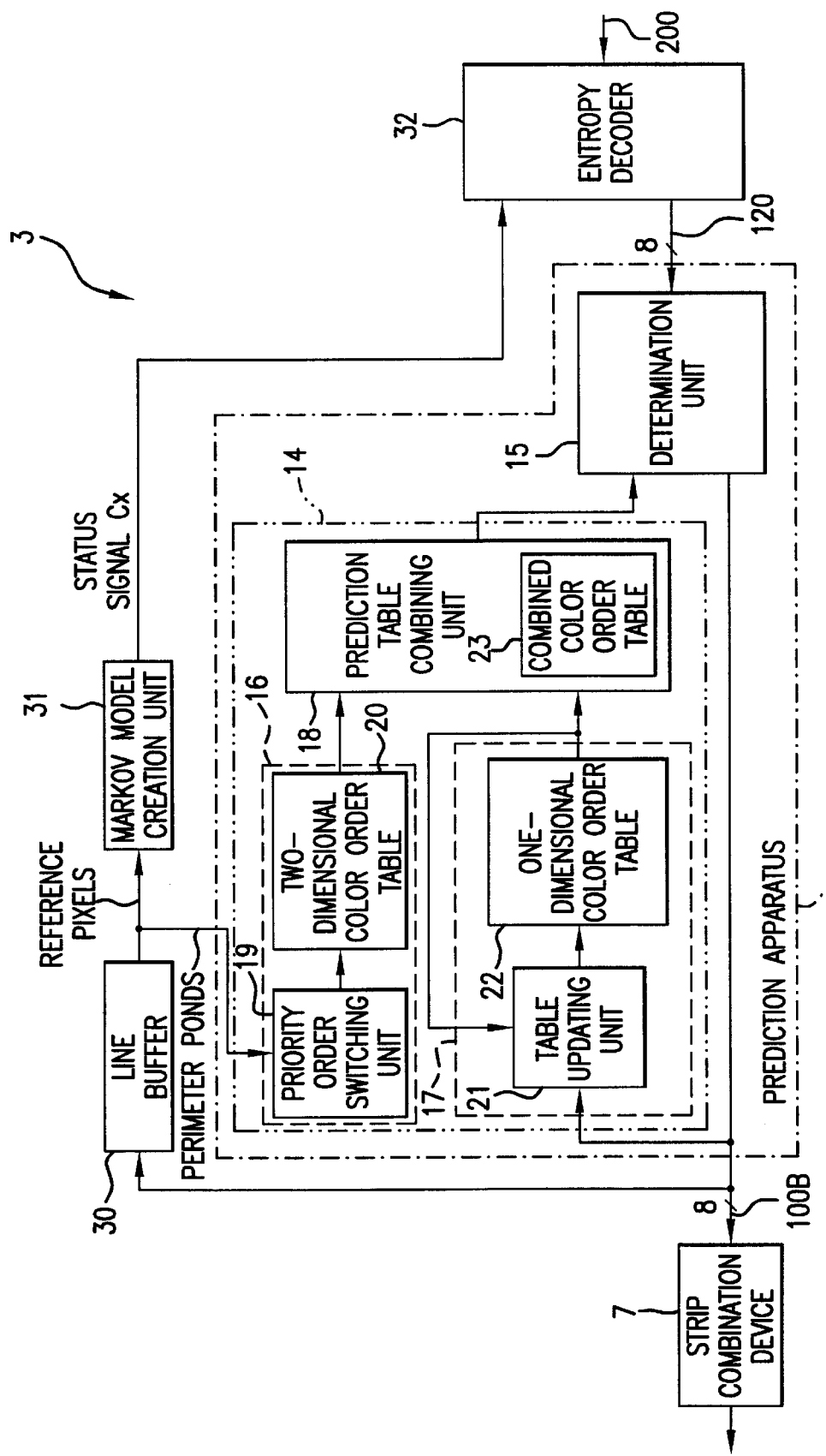
FIG. 2 shows a decoding system utilizing the multi-color image decoding apparatus and method according to the present invention.

FIG. 1 shows a preferred embodiment of the multi-color image encoding system 1 according to the present invention. FIG. 2 shows a preferred embodiment for the multi-color image decoding system 3 corresponding to the encoding system 1 of FIG. 1.

The encoding system 1 includes a strip creation device 5, a line buffer 10 (including a perimeter pixel generation device and a reference pixel generation device), a Markov model creation unit 11 (including a degeneracy device), an entropy encoder 12 and a prediction apparatus 13. The encoding system 1 is structured to transform a data stream of input color pixel data 100A into a data stream of encoding data 200 and to output the encoding data.

The prediction apparatus 13 includes a color order generation unit 14 and a determination unit 15 that functions as an escape symbol generation device. The color order generation unit 14 may include a two-dimensional color order generation unit 16 for determining the upper color order, a one-dimensional color order generation unit 17 for determining the lower color order, and a prediction table combining unit 18 for generating a color order table 23 by combining outputs from the two generation units 16 and 17. The two-dimensional color order generation unit 16 may include a priority order switching unit 19 and a two-dimensional color order table 20. The one-dimensional color order generation unit 17 may include a table updating unit 21 and a one-dimensional color order table 22.

The color pixel data 100A which is the target of encoding is multi-color pixels and includes data with an 8 bit index code per pixel so that color symbols for 256 colors can be displayed. The color pixel data 100A is supplied to the line buffer 10 and the table updating unit 21.

Figure 3:
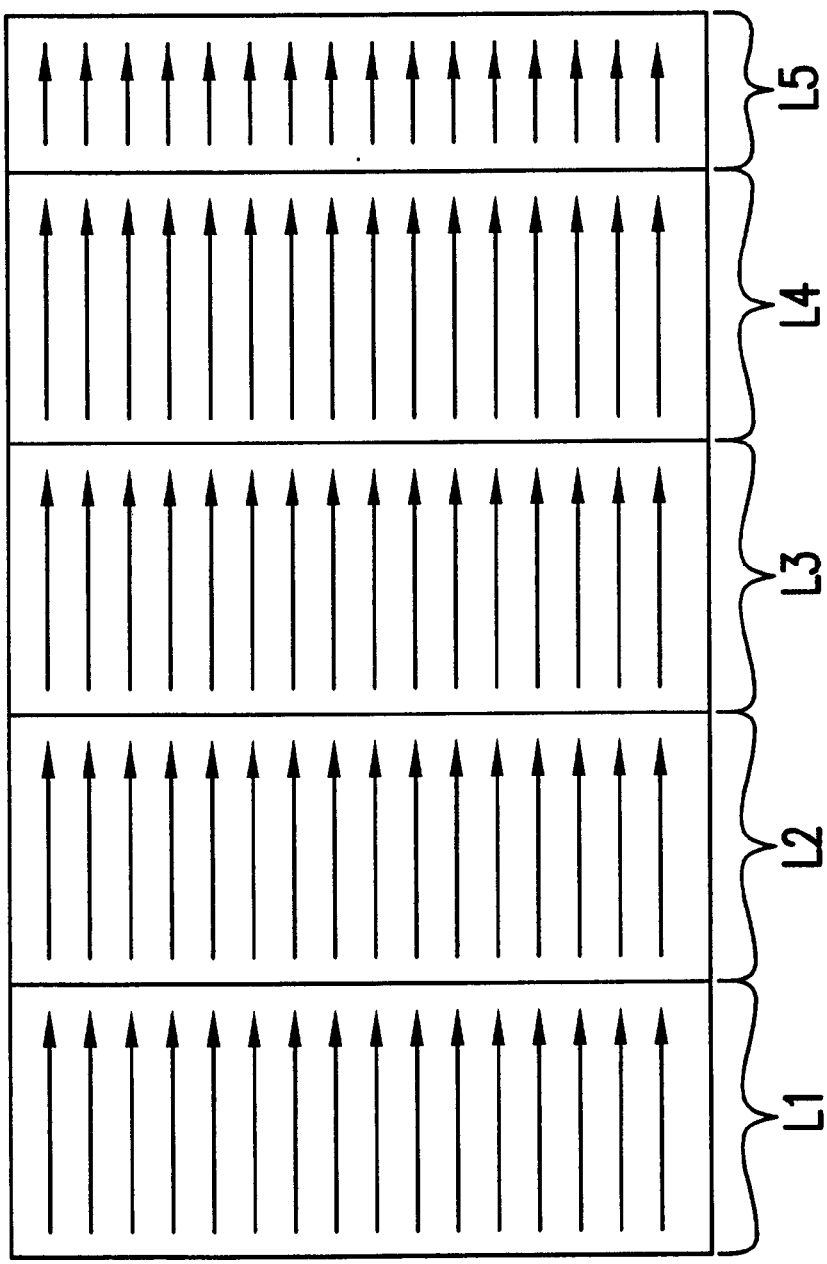
FIG. 3 shows a scanning method employed in the encoding system and decoding system of FIGS. 1 and 2.

The line buffer 10 stores the targeted image as pixel data into strips of a limited number of pixels such as shown in FIG. 3. This apparatus reads the entire image shown in FIG. 3 into memory, and then accesses the memory to take out the data. The data is removed by the strip creation device 5 (such as a CPU) in the form of strips L1–L5 shown in FIG. 3. The line buffer 10 stores at least the most recently input pixels from the strips L1–L5 partitioned into horizontal widths of 16 pixels. Those values are input into the two-dimensional color order generation unit 16 as the perimeter pixels and the two-dimensional color order table 20 is created. The values are also input into the Markov model generation unit 11 as reference pixels and a status signal Cx is generated.

The Markov model generation unit 11 receives the four perimeter pixels (A, B, C and D) excluding the immediately prior pixel (indicated as "–") as reference pixels for the target pixel X as shown in FIG. 4 and a status signal Cx is generated. The immediately prior pixel is not used; instead, the pixel one prior to that pixel is used as follows. When the immediately prior pixel is used as a reference pixel, the status signal Cx input into the entropy encoder 12 and the entropy decoding apparatus 32 is not settled until the color symbol of that pixel is settled. Thus, it is impossible to speed up encoding and decoding. The second prior pixel A is used as the reference pixel due to the demand for higher speeds.

Figure 21:
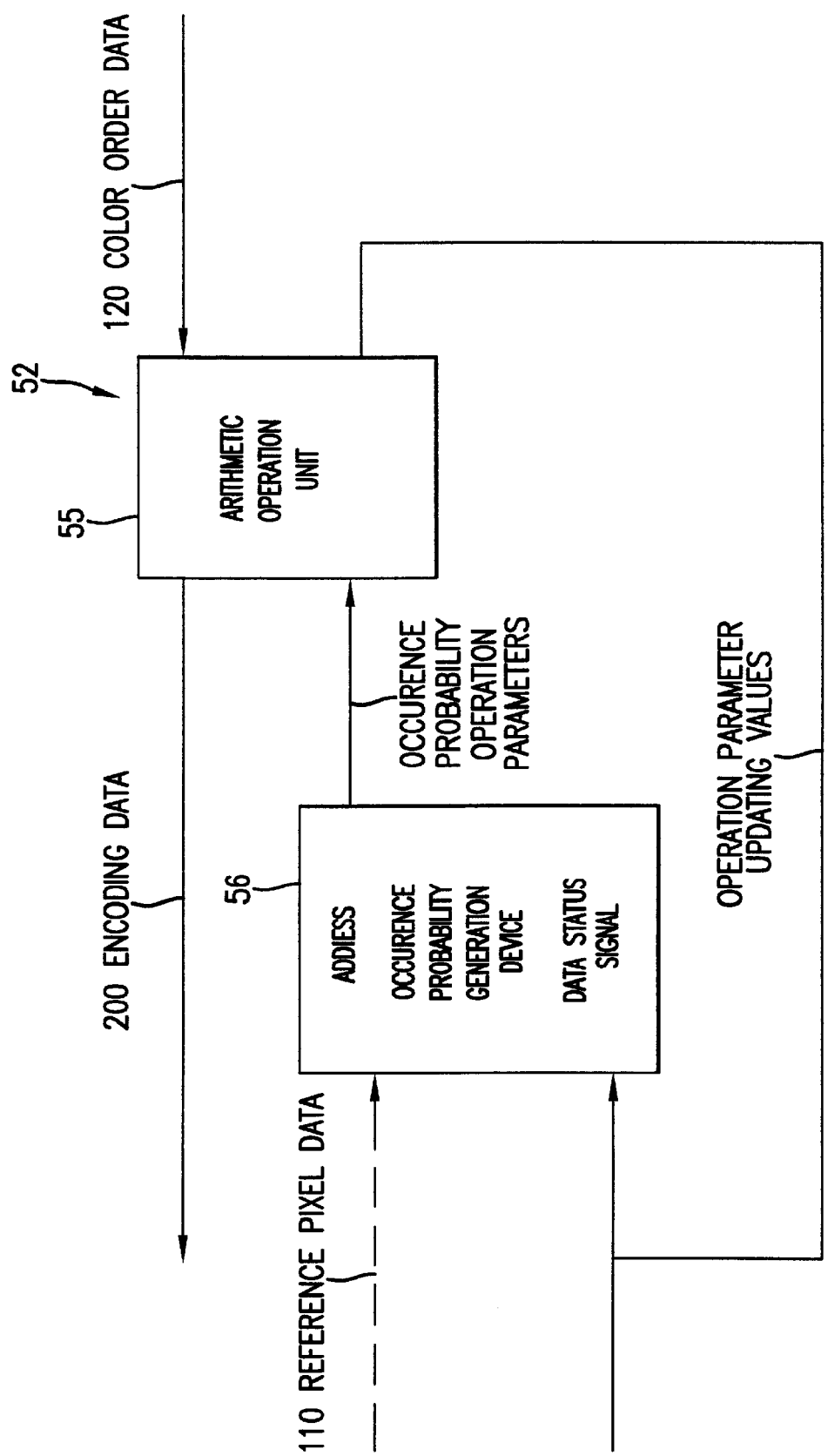
FIG. 21 shows a conventional arithmetic symbol-type entropy encoding device and an entropy decoding device.
Figure 22:
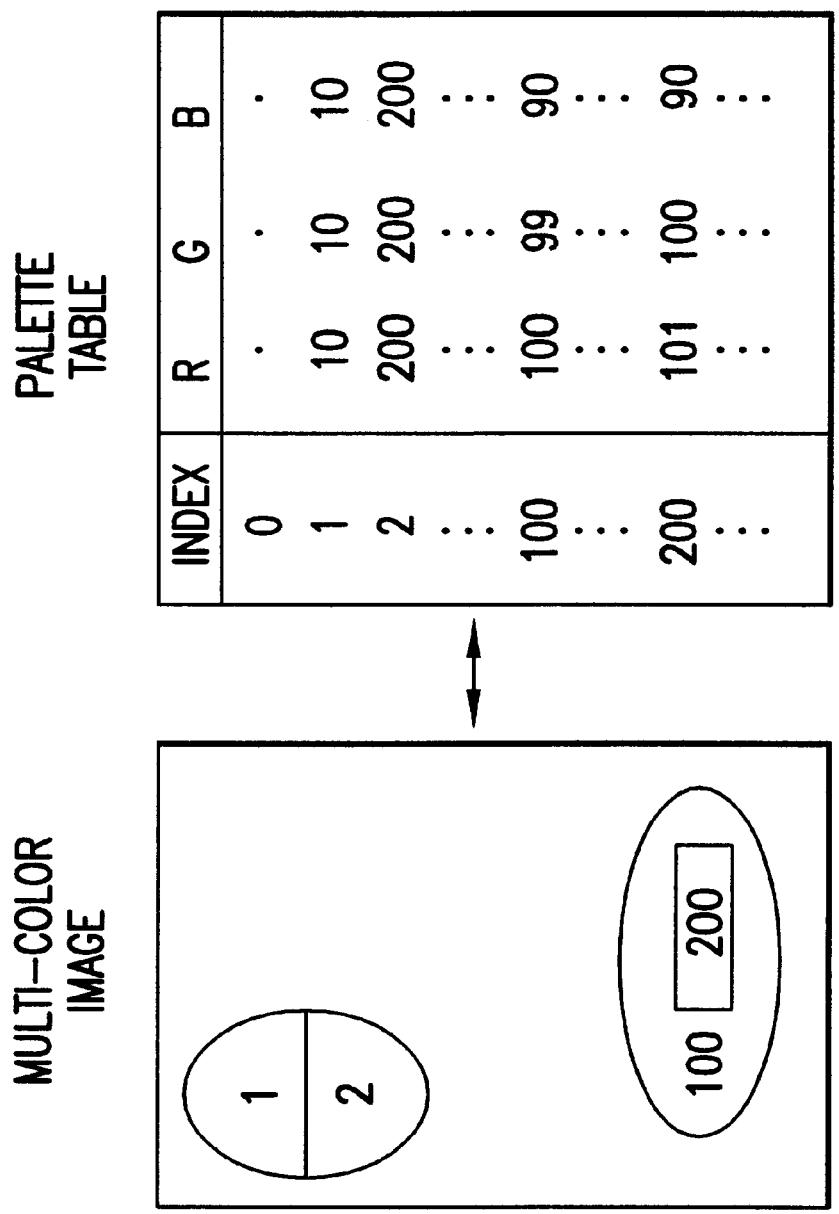
FIG. 22 shows a conventional index for a multi-color image.

The entropy encoder 12 is the arithmetic entropy encoder shown in FIG. 21, which has a transformation table (not shown) for each status parameter.

The prediction apparatus 13 functions as a prediction device. The color pixel data 100A is input into the color order generation unit 14 and the determination unit 15 in the prediction apparatus 13. In addition, the perimeter pixel data from the line buffer 10 is input to the color order generation unit 14.

Figures 4A, 4B:
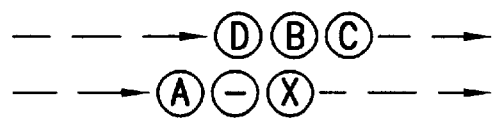
FIGS. 4(A)–(B) show the Markov model and context employed in the encoding system and decoding system with FIG. 4(A) showing the arrangement of reference pixels used as the Markov model and FIG. 4(B) showing the types of contexts (i.e., status signals) in the Markov model.
Figure 5A:
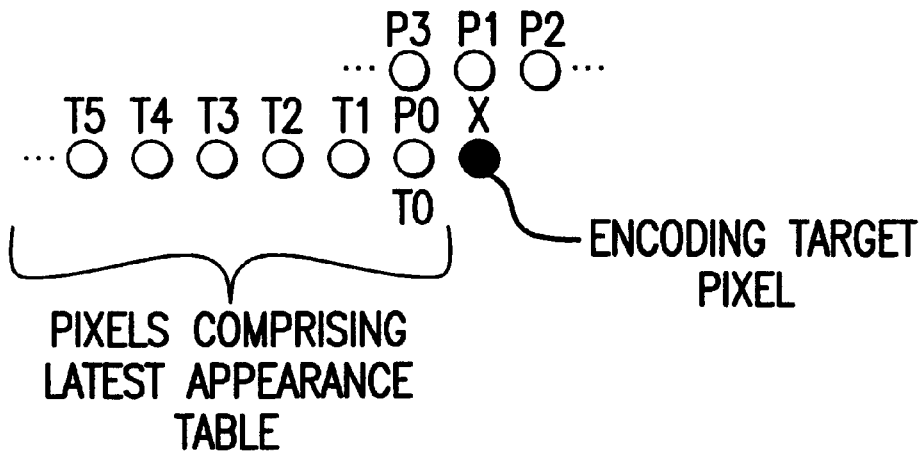
FIGS. 5(A)–(B) show the pixels used in creating the color order tables with FIG. 5(A) showing the arrangement of pixels used and the pixel priority order and FIG. 5(B) showing the color symbols of each pixel in FIG. 5(A)

The perimeter pixel data is input from the line buffer 10 into the priority order switching unit 19. This perimeter pixel data includes pixels P0, P1, P2 and P3 on the perimeter of the target pixel X as shown in FIG. 5(A). The reference pixels A, B, C, and D in the Markov model (FIG. 4(A)) are such that B=P1, C=P2 and D=P3 so that only pixel A is different.

Figure 5B:
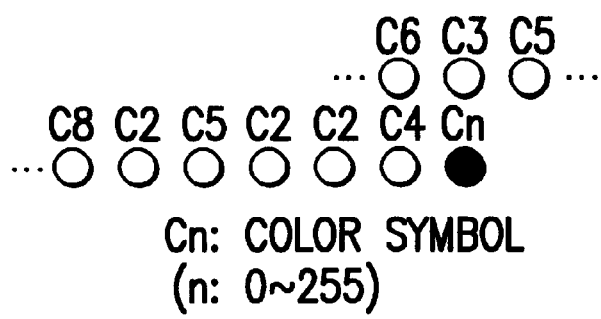

The priority order switching unit 19 changes the priority order based on a predetermined switching command in order to generate the two-dimensional color order table 20. However, the order and position of P0, P1, P2 and P3 are fixed as shown in FIGS. 5 and 7. A method may be used that employs a prescan for the image that is the target of encoding. The priority order pattern for perimeter pixels for which a good compression ratio is obtained is determined beforehand and the number of times the color symbols coincide during encoding and decoding is calculated. A switching command is output such that pixels in orders with a large number of matches are carried to upper orders.

The two-dimensional color order table 20 (FIG. 6) which constitutes the upper part of the color order table in the prediction table combining unit 18 is created based on the command from the priority order switching unit 19. The color order table in the prediction table combining unit 18 (FIG. 8) is a latest appearance table. The upper four orders (the 0th order through the third order) are found from the two-dimensional color order table 20. The two-dimensional color order table 20 is stored in a memory (not shown).

When the color pixel data 100A is input into the table updating unit 21, the table updating unit 21 searches the one-dimensional color order table 22 stored in memory and creates the latest appearance table by raising the color order of the color symbol corresponding to the input color pixel data to the 0th order. For example, when the color symbol C4 in the T0 position (FIG. 5) is input, the table updating unit 21 searches the one-dimensional color order table 22, extracts the pertinent color symbol C4, raises the color order of this color symbol C4 to the 0th order, successively lowers the order of the color symbol C2 from the 0th order to the first order and lowers the order of the color symbol C0 from the first order to the second order. This updated one-dimensional color order table 22 is stored in the memory (not shown).

The one-dimensional color order generation unit 17 may include a FIFO unit made of 256 registers. However, in this configuration, only the top 32 orders (the 0th order through the 31st order) are included in a FIFO unit made up of registers in order to increase processing speed and to create a complete latest appearance table. On the other hand, orders from the 32nd order through the 255th order are included in a 224 byte dual port RAM. When the pertinent color symbol is in the nth order of the 32nd order or lower, the pertinent color symbol is advanced to the 0th order while switching that which was at the 31st order (number 32) to the nth order. The reason the orders from the 32nd order upward are included in this dual port RAM is to boost the processing speed through parallel processing. This may include a single port RAM when lower cost and compactness are particularly taken into consideration.

Data of the two-dimensional color order table and data of the one-dimensional color order table are input into the prediction table combining unit 18 to create the color order table 23 which is one type of latest appearance table such as shown in FIG. 8. This color order table 23 includes perimeter pixels with the 0th order through the third order corresponding to the two-dimensional color order table 20. For example, when the colors of the perimeter pixels P0, P1, P2 and P3 all differ, these pixels occupy the 0th through third order. On the other hand, when P0 through P3 are all the same color, these pixels occupy only the 0th order and the color which is in the first order of the one-dimensional color order table 21 is in the first order of this color order table 23.

This color order table 23 is such that the 0th order is the 0th order of the two-dimensional color order table 20 and moreover is also the 0th order of the one-dimensional color order table 22. After the 255th order (i.e., number 256 from the top), an escape symbol is attached as the code. Concretely, the escape symbol expressed as "11111111" and code indicating "0" expressed as "00000000" are output in the 255th order. In addition, in the 256th order, the same escape symbol of "11111111" is output along with code indicating "1" expressed as "00000001".

Thus, the combined color order table 23 is created without deleting overlapping portions of the one-dimensional color order table 22 and values of the two-dimensional color order table 20 which are the values of the perimeter pixels. Accordingly, a comparison is unnecessary to perform deletion and the speed is increased. While the deterioration of the compression ratio may be 1% or less in comparison with conventional models, the processing speed is increased at least two-fold. In addition, the number of bits of code for the color order may be increased making a correspondence without using this kind of escape symbol, but in this case the efficiency of encoding is greatly reduced because of the increase in number of bits. In contrast, use of escape symbols is extremely beneficial because there is substantially no deterioration of the compression ratio.

Data of the combined color order table 23 is output to the determination device 15 that compares data of the combined color order table 23 and color symbols of the color pixel data 100A that is to be encoded, and outputs the color order data 120 corresponding to the color pixel data 100A that is to be encoded.

The entropy encoder 12 receives the prior status signal Cx and this color order data 120 and outputs the encoding data 200.

Figure 10:
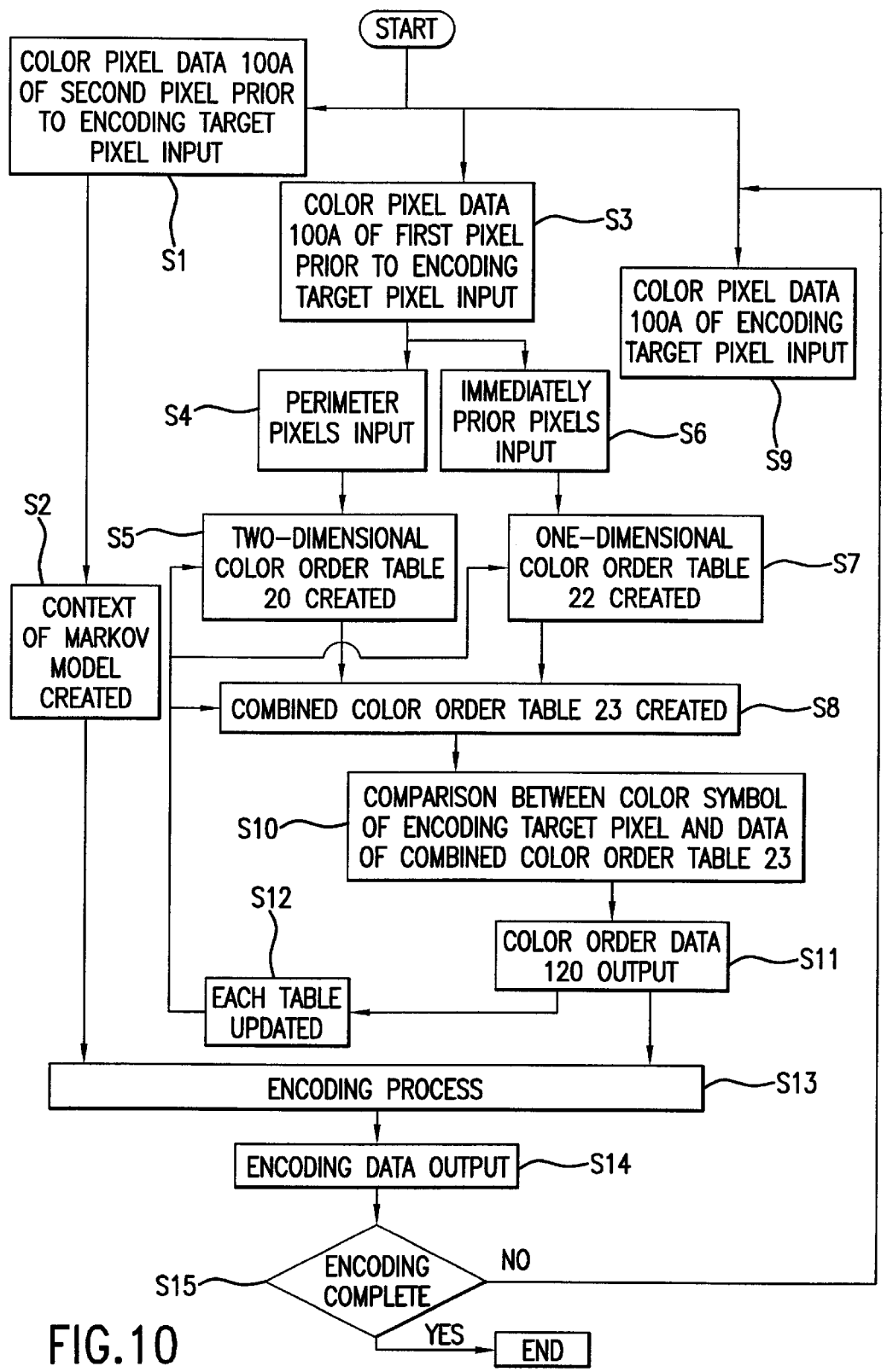
FIG. 10 is a flowchart showing the encoding action in the encoding system.

Actions of the encoding system 1 will now be described with reference to FIG. 10. First, actions of normal cases will be described, and then exception processes for the edge portions of each of the strips L1 to L6 will be described.

In an encoding process, a strip creation step is first executed to take out data from the memory in strip shape. Then the actual encoding of each pixel begins. In the normal encoding process, the color pixel data 100A of the second pixel prior to target pixel has already been input (step S1). The context of the Markov model is created (step S2) by the Markov model creation unit 11 from this data and data of the three reference pixels on the line above the target pixel.

Color order transformation is accomplished in parallel with this context creation process. That is to say, data of one pixel prior to the target pixel has already been input (step S3) and inputting of the perimeter pixels is completely finished (step S4) by inputting of this pixel so that the two-dimensional color order table 20 is created (step S5). On the other hand, the input of the data of one pixel prior to the target pixel is the same as the immediately prior pixel that was input into the one-dimensional color order generation unit 17 (step S6). Using this input, the one-dimensional color order table 22 is created (step S7).

Data from the two-dimensional color order table 20 and the one-dimensional color order table 22 are input to the prediction table combining unit 18 and the combined color order table 23 is created (step S8). At this time, an escape symbol (="11111111") and respectively differing numbers (0 to 3) are attached to all of the color symbols below the 255th order (number 256).

Next, the color pixel data 100A that is the target of encoding is input (step S9), and compared to data of the combined color order table 23 (step S10). When the color pixel data 100A differs from that in the two-dimensional color order table 20, the portion corresponding to the one-dimensional color order table 22 is searched and the pertinent color symbol is found. Furthermore, when that color symbol is, for example, in the 10th order (number 11) of the one-dimensional color order table 22, assuming that the order in the two-dimensional color order table 20 is 4, three is added and the color order data 120 that is the 13th order is output (step 11). Thus, an actual search is accomplished for the two-dimensional color order table 20 and the one-dimensional color order table 22 and when the color symbol is found in the two-dimensional color order table 20, the order is output without change, while when the color symbol is in the one-dimensional color order table 22, this is output after adding a predetermined value.

Figure 9:
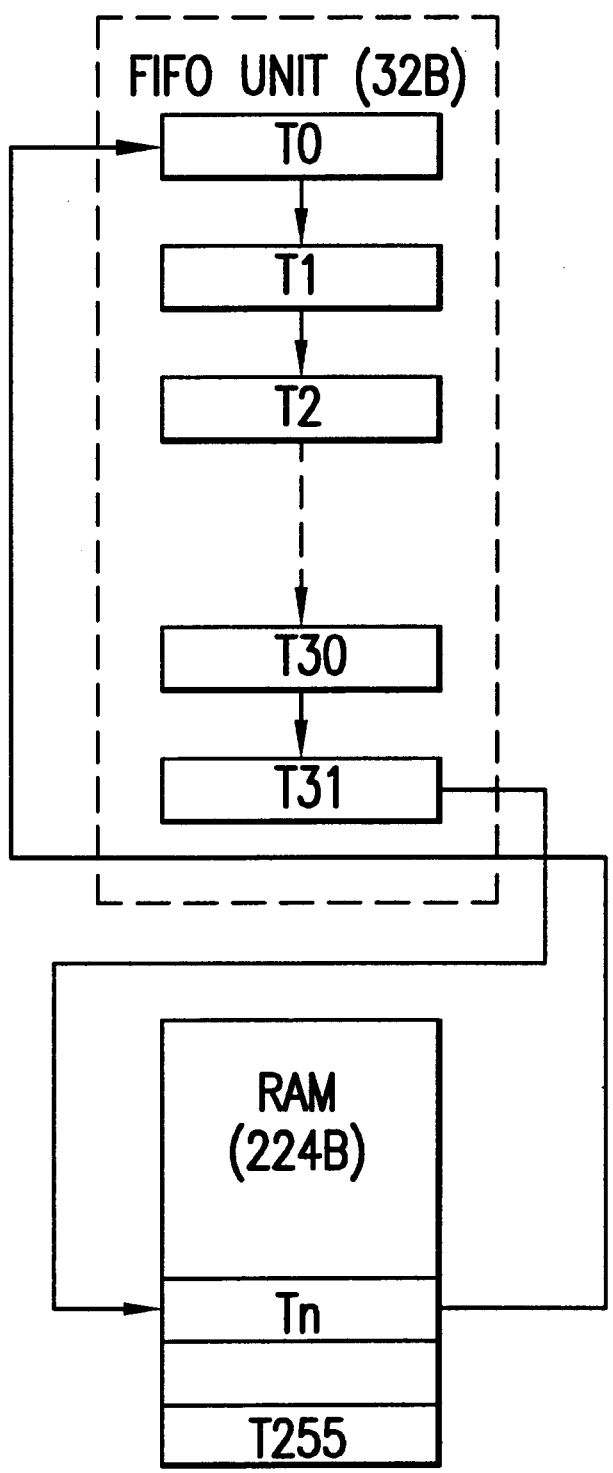
FIG. 9 shows the composition of the one-dimensional color order table and the updating process employed in the encoding system and decoding system.

On the other hand, the pertinent color symbol is brought to the 0th order of the one-dimensional color order table 22, and that color symbol is also brought to the 0th orders of the two-dimensional color order table 20 and the combined color order table 23. This updating operation of each of the tables 20, 22 and 23 is accomplished in step S12. When this occurs, a latest appearance table is created in the lower orders of the one-dimensional color order table 22 and the combined color order table 23 such that the latest item is raised to the 0th order and the other items are all successively lowered by one. However, when the item is from the 32nd order or lower, a switching process is accomplished which brings the item previously in the 31st order to the pertinent order position as shown in FIG. 9.

An encoding process is accomplished (step S13) by the entropy encoder 12 from the output color order data 120 and the context of the Markov model (i.e., the status signal Cx), and the encoding data 200 is output (step S14). Then, a determination is made (step S15) whether encoding has been completed. When encoding is complete, the operation ends; however, while when encoding is not complete, operation returns to step S9.

Now an exception processing for edge portions of each of the strips L1 through L5 will be described.

Figure 11A:
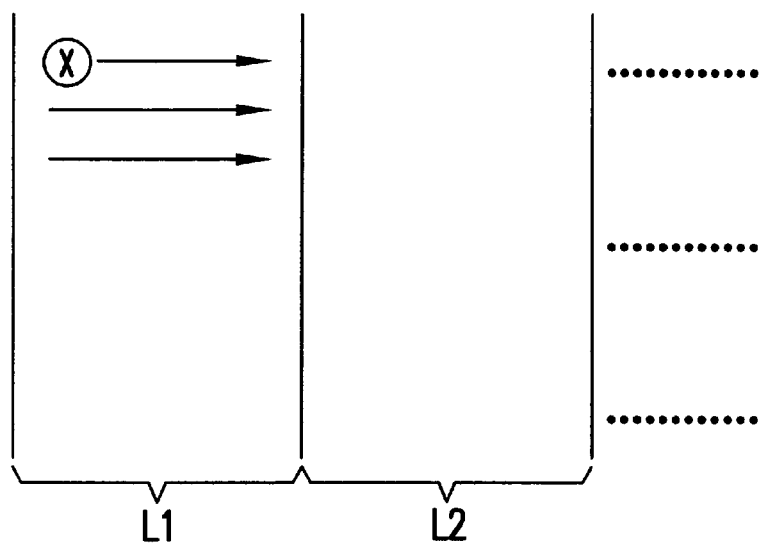
FIGS. 11(A)–(B) show handling of the perimeter pixels used by the two-dimensional color order table in the encoding action with FIG. 11(A) showing the very first encoding target pixel being encoded and FIG. 11(1B) showing an encoding target pixel in the first line being encoded.

First, encoding of the first portion of the first strip L1 (i.e., the pixel at the left edge of the uppermost portion) of FIG. 11(A) will be described. First, the color pixel data 100A that is the target of encoding is input (step S9). At this time, the perimeter pixels have not been input, and consequently the two-dimensional color order table 20 is entirely initialized to the item in the 0th order of the one-dimensional color order table 22, while on the other hand, the one-dimensional color order table 22 is also initialized so that the 256 color symbols are arranged in order from the 0th order through the 255th order. Consequently, a table of the 256 color symbols arranged in order from the 0th order through the 255th order exists in the prediction table combining unit 18 as the combined color order table 23. In addition, the line buffer 10 is also initialized to entirely "0" at the start. The color symbol of a value other than "0" may also be used as the initial value of the line buffer 10.

Following this, steps S10, S11, S12, S13, S14 and S15 (FIG. 10) are accomplished and the flowchart then returns to step S9. At this time, in updating the two-dimensional color order table 20 during updating of each table (step S12), a process is executed wherein the color symbol corresponding to the input color pixel is inserted into the position of P0 of the two-dimensional color order table 20. Because P1, P2 and P3 have not yet been created, the initial value "0" of the line buffer 10 becomes the color symbol. On the other hand, in the one-dimensional color order table 22, a move-to-front process is executed that raises that color symbol corresponding to the input color pixel to the 0th order (i.e., create a latest appearance table).

Figure 11B:
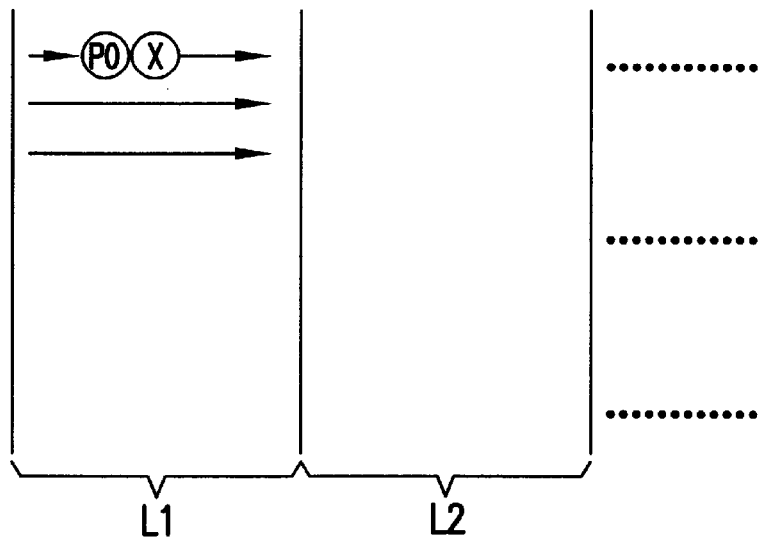

On the uppermost line of the strip L1 shown in FIG. 11(B), only P0 is input as the perimeter pixel. On the other hand, for the one-dimensional color order table 22, creation of a latest appearance table is always accomplished and a process is accomplished for raising the color symbol input most recently to the topmost order. The context of the Markov model is not created for the original item when the first pixel is input, and Cx=0 indicating one color is output as the provisional value as the status signal Cx. The same is also true when the second pixel is input, while the value of A shown in FIG. 4(A) is determined from the point when the third pixel is input, but naturally the original Markov model cannot be created. However, because the color symbol of the pixel one line above, i.e. the index, is initialized to "0" if the color symbol of P0 is "0", the status signal Cx=0 indicating one color is output; however, if the color symbol of P0 is not "0", the status signal Cx=1 indicating two colors is output.

Figure 12A:
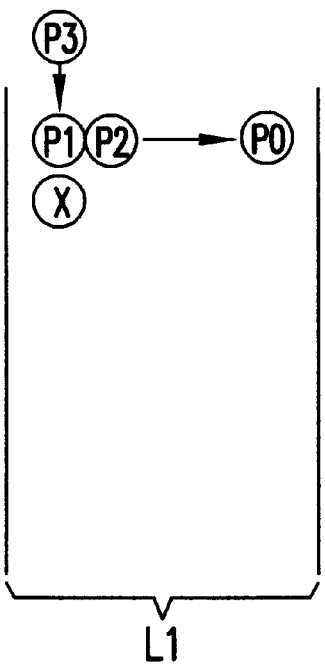
FIGS. 12(A)–(C) show handling of the perimeter pixels used by the two-dimensional color order table in the encoding action of the encoding system with FIG. 12(A) showing encoding when the encoding target pixel has arrived at the start of the second line.

Following this, when the color pixel data 100A of the left edge of the second line of the strip L1 (the 17th pixel) is input, the perimeter pixels P0, P1 and P2 are as shown in FIG. 12(A). That is to say, the first pixel prior to the target pixel X is P0, the 15th prior pixel is P2 and the 16th prior pixel (i.e., the pixel in the same position one line up) is P1. P3 has not yet been created and consequently the process is accomplished with the color symbol "0" inserted.

Figure 12B:
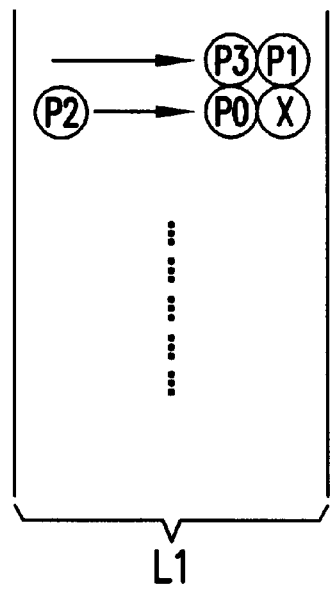
Figure 12C:
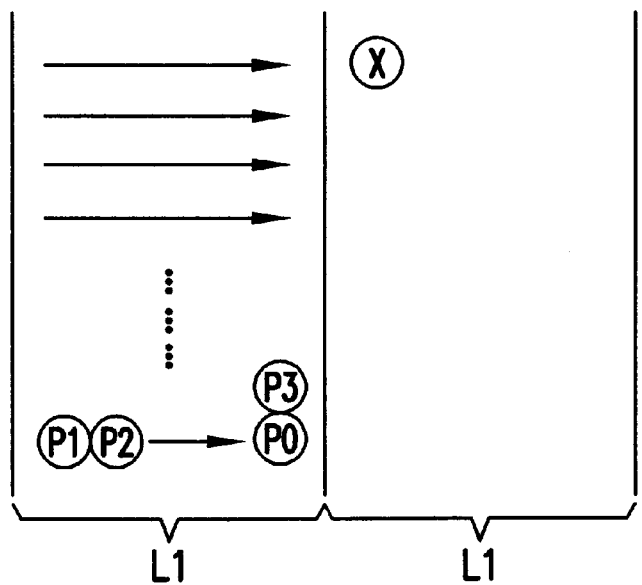

Thus, in this configuration, the perimeter pixels P0 through P3 and the reference pixels A through D are the values of positions a fixed distance from the target pixel X in the line buffer 10. That is to say, as shown in FIG. 12(B) the perimeter pixel P0 is the first prior pixel, the reference pixel A is the second prior pixel, the perimeter pixel P2 (this is also the reference pixel C) is the 15th prior pixel, the perimeter pixel P1 (this is also the reference pixel B) is the 16th prior pixel (i.e., the pixel in the same position the previous line from the target pixel), and the perimeter pixel P3 (this is also the reference pixel D) is the 17th prior pixel. This is the same when the target pixel X and the perimeter pixels are separated into the strips L2 and L1 as shown in FIG. 12(C). Thus, if 17 pixels are stored in the line buffer 10, it is possible to use these as reference pixels and perimeter pixels. In addition, although the simple operation of setting "0" as the initial value of the line buffer 10, a troublesome exception processes such as hypothetically inserting the value "0" are not accomplished. Thus, it is possible to advance from one strip to the next strip using the same process action as normal, without specially implementing a troublesome exception process.

Figure 13:
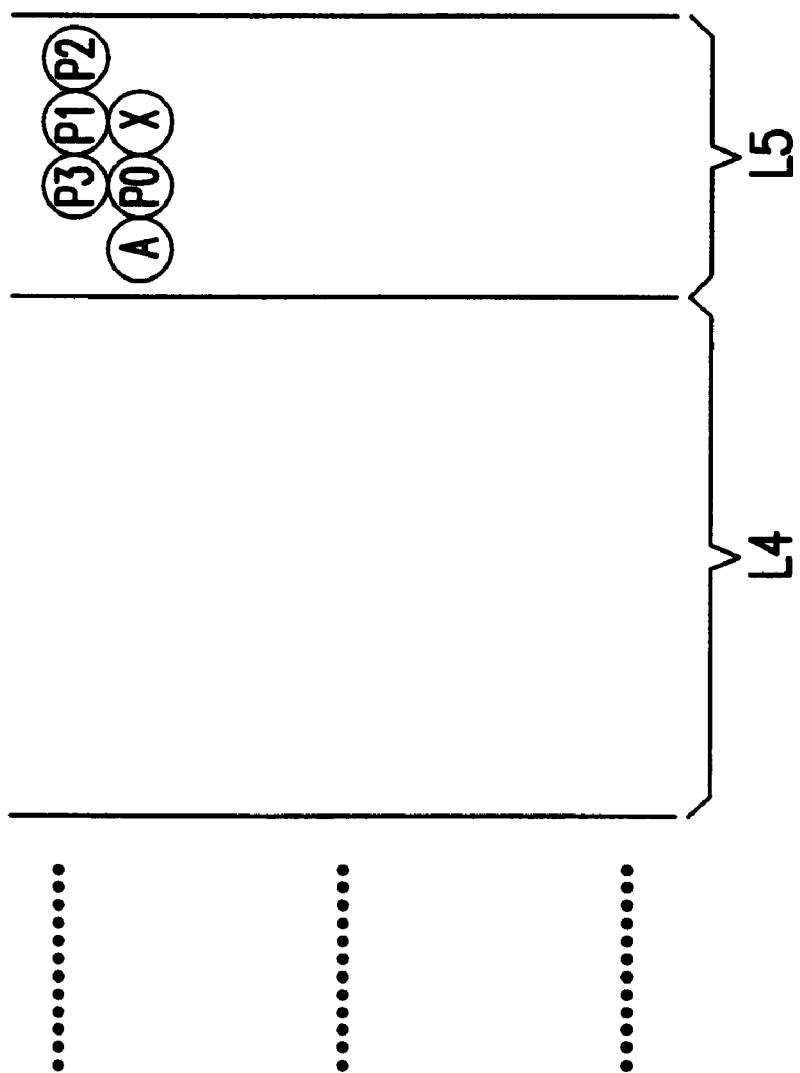
FIG. 13 shows handling of the perimeter pixels used by the two-dimensional color order table and the reference pixels used by the Markov model in the encoding action of the encoding system and showing handing strips of narrow width using the same as with normal strips.

In addition, when the strips are partitioned into horizontal widths of 16 pixels, there are cases where the horizontal width of the last strip L5 is less than 16 pixels as shown in FIG. 3. In that case, when the horizontal width of that strip L5 is four pixels or greater with (n) being the number of pixels in that horizontal width, then P0 is the first pixel prior to the target pixel, reference pixel A is the second prior pixel, perimeter pixel P2 (the reference pixel C) is the (n−1)st prior pixel, perimeter pixel P1 (the reference pixel B) is the (n)th prior pixel, and perimeter pixel P3 (reference pixel D) is the (n+1)st prior pixel as shown in FIG. 13.

When the horizontal width of the strip L5 is 3 pixels, reference pixel A becomes the same as the reference pixel C and both are in the location of the perimeter pixel P2, as shown in FIG. 14(A). The remainder have the same relationship as when the horizontal width is four pixels. When the horizontal width of strip L5 is 2 pixels, the first pixel prior to the target pixel becomes P0, the second prior pixel becomes P1 and the third prior pixel becomes P3 as shown in FIG. 14(B). In this example, P2 becomes the (2−1) prior pixel (i.e., the first prior pixel) and has the same value as P0. However, reference pixel C corresponding to P2 cannot be the first prior pixel and instead becomes the position of P1. Consequently, the reference pixels B, C and A are all at the position of P1. Furthermore, when the horizontal width of the strip L5 is one pixel, by similarly applying the relationships of FIG. 13, the first prior pixel becomes P0, P1 and P2, and the second prior pixel becomes P3. Here, the reference pixels A, B, C and D are all the same and at the position of P3.

When the above-described exception processes are accomplished for an edge portion, the portions which are lacking in the positional relationships of the perimeter pixels and reference pixels are hypothetically set to "0". For strips less than a 16 pixel horizontal width, the processing is more efficient than cases of processing by making the horizontal width to be 16 pixels. In addition, it is possible to easily deal with images having a horizontal width with an arbitrary number of pixels.

The decoding system 3 of a multi-color image corresponding to the encoding system 1 will now be described with reference to FIG. 2.

The decoding system 3 may include a strip combination device 7, a line buffer 30 (including a perimeter pixel generation device and a reference pixel generation device), a Markov model generation unit 31 (i.e., a degeneracy device), an entropy decoder 32 and a prediction apparatus 33. The decoding system is composed such that the data stream of the encoding data 200 is transformed into a data stream of color pixel data 100B and output. The algorithm of the decoding system 3 is the reverse of the algorithm of the encoding system 1. Accordingly, the data stream and bit composition of the color pixel data 100A and the color pixel data 100B are the same.

The prediction apparatus 33 may have has the same composition as the prediction apparatus 13 in the encoding system 1. That is, the prediction apparatus 33 may include a color order generation unit 14 and a determination unit 15 that also functions as an escape symbol generation device. In addition, the color order generation unit 14 includes a two-dimensional color order generation unit 16 for determining the upper color order, a one-dimensional color order generation unit 17 for determining the lower color order and a prediction table combining unit 18 for generating a color order table 23 by combining outputs from the two generation units 16 and 17. Furthermore, the two-dimensional color order generation unit 16 includes a priority order switching unit 19 and a two-dimensional color order table 20. The one-dimensional color order generation unit 17 includes a table updating unit 21 and a one-dimensional color order table 22.

The line buffer 30 (similar to the line buffer 10 of the encoding system 1) can store at least 17 pixels worth of data. Those values are output to the two-dimensional color order generation unit 16 as perimeter pixels and the two-dimensional color order table 20 is created. Those values are also output to the Markov model generation unit 31 as reference pixels and a status signal Cx is generated.

The entropy decoding apparatus 32 uses the status signal Cx and performs a decoding operation on the input encoding data 200 in the reverse order as the entropy encoder 12, to transform this data into the color order data 120 which is output to the prediction apparatus 33. The entropy decoding apparatus 32 uses an algorithm that is reverse to that used in the entropy encoder 12. Accordingly, when an arithmetic encoding apparatus is used in the entropy encoder 12, the entropy decoding apparatus 32 is composed as an arithmetic decoding apparatus with the same composition. In addition, when a Huffman encoding apparatus is used in the entropy encoder 12, the entropy decoding apparatus 32 is composed as a Huffman decoding apparatus with the same composition. Thus, the encoding data 200 can be accurately transformed into and output as the color order data 120 paired therewith.

The prediction apparatus 33 functions as a prediction device. The same combined color order table 23 is set therein and the corresponding color symbols from the color order table 23 are decoded and output as the color pixel data 100B based on the input color order data 120 and the perimeter pixel data.

Figure 15:
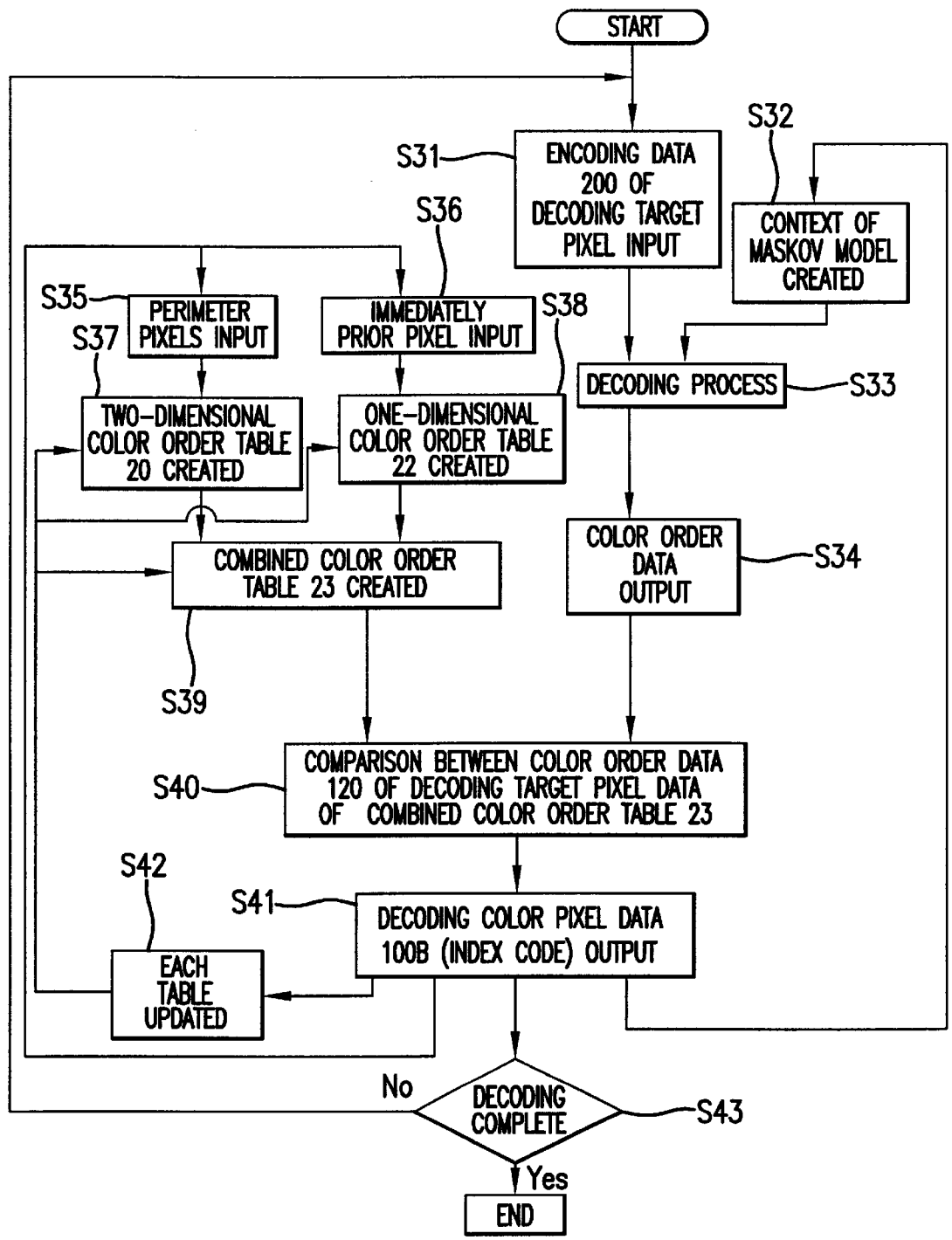
FIG. 15 shows the decoding action in the decoding system.
Figure 17:
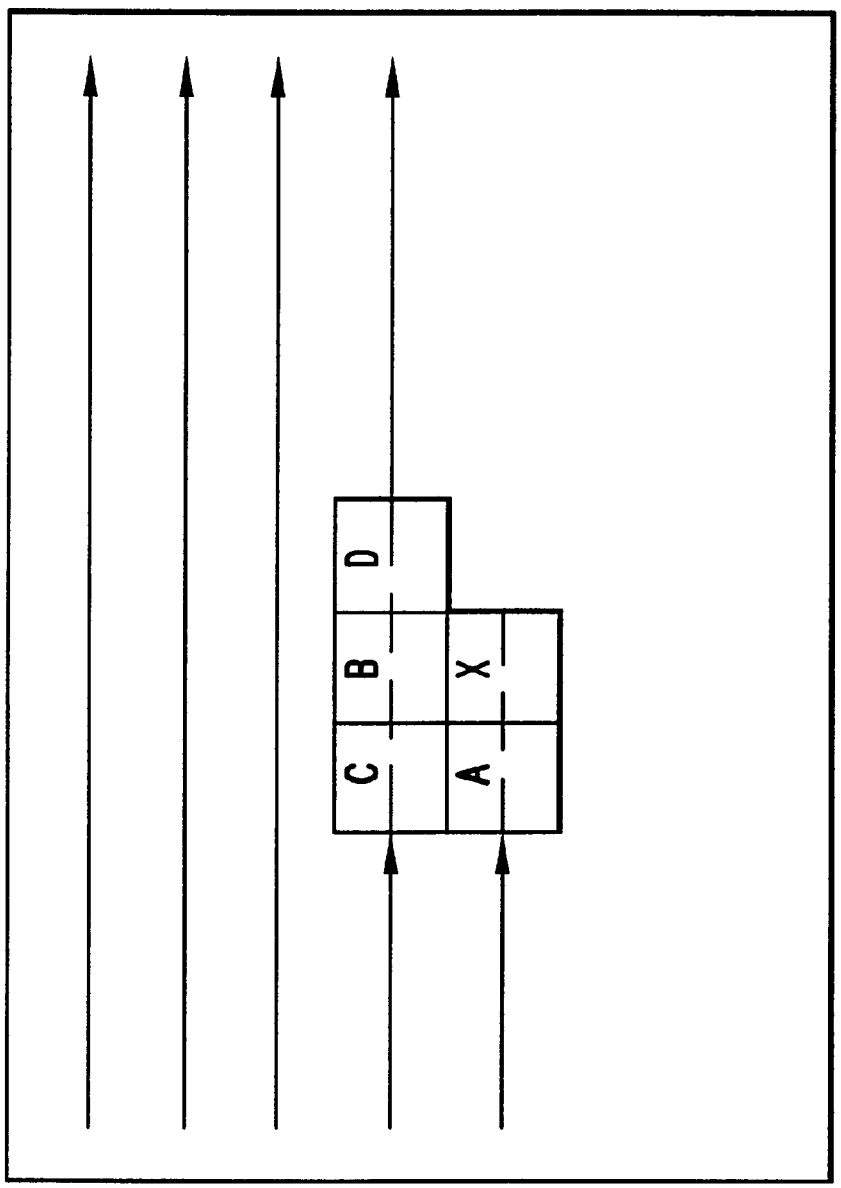
FIG. 17 shows the reference pixel data with respect to encoding target pixel data conventionally.

Actions of the decoding system 3 will now be described with reference to FIG. 15. First, the encoding data 200 of the decoding target pixel is input to the entropy decoder 32 (step S31). The context of the Markov model is created based on data of the two prior pixels (step S32) and is input as the status signal Cx to the entropy decoding apparatus 32. The entropy decoding apparatus 32 accomplishes a decoding process on the encoding data 200 using the status signal Cx (step S33).

Using the decoding process, the color order data 120 is output (step S34) to the determination unit 15 in the prediction apparatus 33.

On the other hand, the data already decoded as the color pixel data 100B is input into the priority order switching unit 19 as perimeter pixels via the line buffer 30 (step S35) and is input as the immediately previous pixel into the table updating unit 21 (step S36). When the perimeter pixels are input, the two-dimensional color order table 20 is created (step S37). When the immediately prior pixel is input, the one-dimensional color order table 22 is created (step S38).

The two-dimensional color order table 20 may be the same as in FIG. 6 and the one-dimensional color order table 22 may be the same as in FIG. 7. Furthermore, the table updating unit 21 is such that the 0th order to the 31st order is in a FIFO unit that accomplishes a complete move-to-front operation, while the lower orders are made of 224 byte RAM.

The combined color order table 23 is created from the two tables 20 and 22 (step S39). Data of this color order table 23 is input into the determination unit 15 and compared against the color order data 120 (step S40). The color order data may consist of the 63rd order of the code "00111111" and in the case of the 256th order, the escape symbol "11111111" and "00000001". As a result of this comparison, the color pixel data 100B (=index code) of the color symbol in the pertinent order in the combined color order table 23 is output (step S41).

When the code of the second order is output, the color pixel data 100B of the corresponding color symbol is output and an updating process is accomplished (step S42) such that the color symbol in the combined color order table 23 is raised to the 0th order, the symbol in the 0th order is lowered to the first order and the symbol in the first order is lowered to the second order. This updating is accomplished for both the two-dimensional color order table 20 and the one-dimensional color order table 22.

When this updating operation occurs, the two-dimensional color order table 20 is such that the order of P0, P1, P2 and P3 is determined. However, if the decoded item is the same as any of P0, P1, P2 or P3 (i.e., if this is the same as P2 in the second order) then that color symbol is raised to the 0th order. At that time, assuming absolutely no move-to-front process is accomplished for the one-dimensional color order table 22, this becomes different from the one-dimensional color order table 22 during encoding. Consequently, a search is made in the one-dimensional color order table 22 for the same color symbol as the color symbol in the position of the second order in the two-dimensional color order table 22 and that color symbol is raised to the 0th order and a move-to-front process is accomplished which arranges the other items.

At this time, the search of the one-dimensional color order table 22 can be limited to a search of the upper 17 items (the 0th order to the 16th order) in the one-dimensional color order table 22. That is to say, P0 through P3 are one of the latest 17 pixels in the one-dimensional color order table 22. Thus, when the pixel that is decoded is one of P0 through P3, it is enough to compare at most 17 times in updating the one-dimensional color order table 22. Thus, operation is limited to at most 17 times because the image is partitioned into strips with a horizontal width of 16 pixels, and it is possible to limit the number of reference pixels stored in the line buffer 10.

On the other hand, when the pixel that is decoded is not any of P0 through P3, the color order data 120 is output in step S34, when P0 through P3 total four colors, the item corresponding to that color order data 120 is made to correspond to the 153rd order in the one-dimensional color order table 22, and consequently, without searching the color symbol of the 153rd order is directly extracted and raised to the 0th order.

Thus, in the case of decoding, 16 comparisons is extremely small when compared with the number of searches (256×4) used to eliminate redundant colors in Japanese Laid-Open Patent Publication 6-276041 so that an extremely fast process is possible. Searches during decoding may be equivalent to that during encoding, to search all of the one-dimensional color order table 22. However, in terms of high speed processing, the above configuration is preferable.

When the color pixel data 100B is output, a determination is made in step S43 whether decoding has been completed. When there is no further inputting of a new encoding data 200 and the determination is made that decoding has been completed, the operation concludes. On the other hand, when continuing operation, the flowchart returns to step S31. Even in decoding, an exception process relating to the edge portions of the strips and strips with small horizontal width are executed using the same algorithms as shown in FIGS. 11–14. Moreover, the decoded color pixel data 100B is decoded by the strip combination device 7 in strip shape through the strip decoding step and read into the memory (not shown), and is decoded as a total image such as shown in FIG. 3.

In this configuration, orders from the 255th order and lower are output as two codes (a total of 16 bits) comprised of an escape symbol and a code indicating the numerical value obtained by subtracting 256 from the total number of orders (counting from the first). Those that have low orders such as 255th order or less display color codes that do not occur frequently. Hence, outputting of two codes does not frequently occur. Moreover, even if these occur, following this these are assigned to easily output orders, and consequently the compression ratio does not deteriorate substantially as discussed above. In comparison to this, the effect of eliminating the sorting process of omitting redundant color code and switching of orders is extremely large.

The Markov model in this configuration differs from that of the conventional art and the pixel immediately prior to the encoding target pixel is not used as a reference pixel. However, deterioration of the compression ratio is kept to several percent. On the other hand, the processing speed is accelerated to nearly double because a pipeline process between the color order transformation and the entropy encoder 12 or the entropy decoding apparatus 32 is possible. In this configuration, the immediately prior pixel is used as a perimeter pixel. However even in cases differing from this configuration, wherein the immediately prior pixel is not used as a perimeter pixel in creating the color order table 23, the deterioration of the compression ratio is kept to around 10% and the processing speed is doubled.

Furthermore, the line buffers 10 and 30 are such that the images are partitioned into strips and consequently it is possible to make these have small capacity. The pixel one line above is viewed as the perimeter pixel used in color order transformation and the reference pixel used in the Markov model, but because the horizontal width is partitioned into strips, the number of pixels that must be stored in order to view the pixel one line above can be reduced. Consequently, it is possible to make the line buffers 10 and 30 more compact, smaller capacity and less costly.

The above-described configuration is the preferred configuration of the embodiment of the present invention and this is intended to be illustrative and not limiting as numerous variations are possible without varying from the scope of the present invention. For example, the color pixel data 100A may be n bit (n an integer two or larger) color pixel data 100A.

Moreover, the method of partitioning the target image into strips may be applied to the conventional apparatus and method in which overlapping color symbols described in FIG. 23 are deleted. In this case, high speed processing may be obtained. Moreover, the method of partitioning the target image into strips may be adopted for a normal encoding system 50 or decoding system 60 such as shown in FIG. 16 which do not have a combined color order table 23 as in the presently described embodiments or a conventional combined color order table such as shown in FIG. 23. Thus, benefits such as a low capacity line buffer 51 and reduced cost may be obtained.

In addition, the horizontal width of the strips are preferably 8 to 64 pixels in consideration of the capacities of the line buffers 10 and 30. 16 to 32 pixels is most preferable in consideration of search efficiency and compression efficiency caused by the exception processes at the edge portions. Furthermore, as the composition ratio between the RAM and FIFO portion in the one-dimensional color order generation unit 17, it is preferable for the FIFO portion to include ¼ to 1/32 of the total and the remainder to be RAM. It is most preferable for the FIFO portion to comprise ⅛ to 1/16 with the remainder RAM because it is possible to achieve high speed processing without the compression ratio dropping much.

In addition, it is possible to use run length encoding (and decoding) technology or other encoding (and decoding) technologies.

Furthermore, as the context of the Markov model, besides the 4 statuses of one color through four colors, other status signals Cx may be generated such as status signals caused to differ depending on where the differing colors are as shown in FIG. 20.

In addition, in order to make the reference pixels of the Markov model different from the perimeter pixels used in color order transformation, the third prior pixel or greater may be used as a reference pixel besides using the second prior pixel without using the first prior pixel as a reference pixel as in this configuration of the above embodiment. That is to say, the second prior pixel need not be used as a reference pixel in addition to the first prior pixel.

For the Markov model context creation technology, technology may be used of each type of encoding and decoding independently rather than in parallel with the technology which causes color order transformation.

In the above-described multi-color image encoding apparatus and method of the present invention, the target image is partitioned into strips, which enables drastic reduction in the algorithm resulting in a high speed encoding process and which enables efficient encoding of a multi-color image of arbitrary size. Moreover, a perimeter pixel generation device such as line buffer may be reduced in capacity and in cost.

Moreover, in the above-described multi-color image decoding apparatus and method of the present invention, the target image is partitioned into strips, which enables drastic reduction in the algorithm amount resulting in high speed decoding process and which enables efficient decoding of a multi-color image of arbitrary size. Moreover, a perimeter pixel generation device such as line buffer may be reduced in capacity and in cost.

While the invention has been described in relation to preferred embodiments, many modifications and variations are apparent from the description of the invention, and all such modifications and variations are intended to be within the scope of the present invention as defined in the appended claims.

What is claimed is:

1. A multi-color image encoding apparatus comprising:
prediction means, having a color order table in which a color order of each color symbol is established, for reading and outputting the color order of the color symbol corresponding to target color pixel data to which an index code of a plurality of bits is attached from the color order table;
perimeter pixel generation means for outputting two-dimensional perimeter pixel data for the target color pixel data based on input color pixel data;
entropy encoding means for transforming the color order data and outputting encoding data, wherein the color order table is created by combining.
a two-dimensional color order table that establishes the color order for the color symbols of each pixel of said two-dimensional perimeter pixel data, the color orders being used as upper color orders, and
a one-dimensional color order table for lower color order that establishes a predetermined number of color orders for the color symbols corresponding to the color pixel data that is input ahead of the target color pixel data,
the combined color order table being generated by creating a complete latest appearance table that moves the color order of the color symbols corresponding to the color pixel data most recently input to an uppermost line; and
strip creation means for partitioning the target image to be encoded into strips having a horizontal width of a limited number of pixels less than a number of pixels of an image width and a vertical height of one pixel, wherein each of the strips is successively encoded.

2. The multi-color image encoding apparatus of claim 1, wherein when said input color pixel data is encoded using said two-dimensional perimeter pixel data, the position of each perimeter pixel is determined by a scanning distance from said target color pixel.

3. The multi-color image encoding apparatus of claim 1, wherein a horizontal width of each said strip consists of 16–32 pixels.

4. The multi-color image encoding apparatus of claim 1, wherein when said target color pixel data is encoded using Markov model reference pixels, the position of each reference pixel is determined by a scanning distance from said target color pixel.

5. The multi-color image encoding apparatus of claim 1, wherein if the horizontal width of said target image is not evenly divisible by the horizontal width of the strip and the number of pixels in the horizontal width of the last strip is n, then the perimeter pixel that is one before the target pixel is the pixel input one before and the pixels on one line are n prior pixels, the pixel which is one advanced pixel is (n−1) prior pixel, the pixel which is one prior to the pixels on one line is (n+1) prior pixel, and the apparatus executes an exception process on said perimeter pixels that adopts one prior pixel when the value of (n−1) is 1 or less;
wherein a strip with an arbitrary horizontal width is handled by executing a process similar to said exception process of said perimeter pixels for said last strip as said reference pixel, the two prior pixels are the reference pixels to be adopted when the values of n and (n−1) are 1 or less.

6. A multi-color image encoding apparatus comprising:
prediction means, having a color order table in which a color order of each color symbol is established, for reading and outputting the color order of the color symbol corresponding to target color pixel data to which an index code of a plurality of bits is attached from the color order table;
perimeter pixel generation means for outputting two-dimensional perimeter pixel data for the target color pixel data based on input color pixel data;
entropy encoding means for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color order that establishes a predetermined number of color orders for the color symbols corresponding to the color pixel data that is input ahead of the target color pixel data, the combined color order table being generated by creating a complete latest appearance table that moves the color order of the color symbols corresponding to the color pixel data most recently input to an uppermost line, wherein when color symbols in the two-dimensional color order table overlap color symbols in the one-dimensional color order table, the overlap color symbols are not deleted from the one-dimensional color table; and strip creation means for partitioning the target image to be encoded into strips with a horizontal width of a number of pixels less than a number of pixels of an image width and a vertical height of one pixel, wherein each of the strips is successively encoded.

7. The multi-color image encoding apparatus of claim 6, wherein when said input color pixel data is encoded using said two-dimensional perimeter pixel data, the position of each perimeter pixel is determined by a scanning distance from said target color pixel.

8. The multi-color image encoding apparatus of claim 6, wherein a horizontal width of each said strip consists of 16–32 pixels.

9. The multi-color image encoding apparatus of claim 6, wherein when said target color pixel data is encoded using Markov model reference pixels, the position of each reference pixel is determined by a scanning distance from said target color pixel.

10. The multi-color image encoding apparatus of claim 6, wherein if the horizontal width of said target image is not evenly divisible by the horizontal width of the strip and the number of pixels in the horizontal width of the last strip is n, then the perimeter pixel that is one before the target pixel is the pixel input one before and the pixels on one line are n prior pixels, the pixel which is one advanced pixel is (n−1) prior pixel, the pixel which is one prior to the pixels on one line (n+1) prior pixel, and the apparatus executes an exception process on said perimeter pixels that adopts one prior pixel when the value of (n−1) is 1 or less;

wherein a strip with an arbitrary horizontal width is handled by executing a process similar to said exception process of said perimeter pixels for said last strip as said reference pixel, the two prior pixels are the reference pixels to be adopted when the values of n and (n−1) are 1 or less.

11. A multi-color image encoding apparatus, wherein target color pixel data are encoded and output as encoding data, the apparatus comprising:

a strip creation device that partitions a target image into strips having a horizontal width of a number of pixels less than a number of pixels of an image width and a vertical height of one pixel; and an encoder that successively encodes each of the strips and;

entropy encoding means for transforming color order data and outputting encoding data, wherein the color order table is created by combining:
a two-dimensional color order table that establishes the color order for the color symbols of each pixel of said two-dimensional perimeter pixel data, the color orders being used as upper color orders, and
a one-dimensional color order table for lower color order that establishes a predetermined number of color orders for the color symbols corresponding to the color pixel data that is input ahead of the target color pixel data,
the combined color order table being generated by creating a complete latest appearance table that moves the color order of the color symbols corresponding to the color pixel data most recently input to an uppermost line.

12. A multi-color image encoding method comprising:

a prediction step of reading and outputting a color order of a color symbol corresponding to target color pixel data to which an index code of a plurality of bits is attached from a color order table;

a perimeter pixel generation step for outputting two-dimensional perimeter pixel data for the target color pixel data based on input color pixel data;

an entropy encoding step for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders for the color symbols corresponding to the color pixel data that is input ahead of the target color pixel data, the combined color order table being generated by creating a complete latest appearance table that moves the color order of the color symbols; and a strip creation step for partitioning the target image into strips having a horizontal width of a number of pixels less than a number of pixels of an image width and a vertical height of one pixel, wherein each of the strips is successively encoded.

13. The multi-color image encoding method of claim 12, wherein when said input color pixel data is encoded using said two-dimensional perimeter pixel data, the position of each perimeter pixel is determined by a scanning distance from said target color pixel.

14. The multi-color image encoding method of claim 12, wherein the horizontal width of each said strip consists of 16–32 pixels.

15. The multi-color image encoding method of claim 12, wherein when said target color pixel data is encoded using Markov model reference pixels, the position of each reference pixel is determined by a scanning distance from said target color pixel.

16. The multi-color image encoding method of claim 12, wherein if the horizontal width of said target image is not evenly divisible by the horizontal width of the strip and the number of pixels in the horizontal width of the last strip is n, then the perimeter pixel that is one before the target pixel is the pixel input one before and the pixels on one line are n prior pixels, the pixel which is one advanced pixel is (n−1) prior pixel, the pixel which is one prior to the pixels on one line are (n+1) prior pixel, and an exception process is executed on said perimeter pixels that adopts one prior pixel when the value of (n−1) is 1 or less;

wherein a strip is handled by executing a process similar to said exception process of said perimeter pixels for said last strip as said reference pixel, and the two prior pixels are the reference pixels when the values of n and (n−1) is one or less.

17. A multi-color image encoding method comprising:

a prediction step for reading and outputting a color order of a color symbol corresponding to target color pixel data to which an index code of a plurality of bits is attached from a color order table;

a perimeter pixel generation step for outputting two-dimensional perimeter pixel data for the target color pixel data based on input color pixel data;

an entropy encoding step for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders corresponding to the color pixel data that is input ahead of the target color pixel data, the combined color order table being generated by creating a complete latest appearance table that moves the color order of the color symbols corresponding to the color pixel data most recently input to an uppermost line, wherein when color symbols in the two-dimensional color order table overlap color symbols in the one-dimensional color order table, then the overlapped color symbols arc not deleted from the one-dimensional color table; and a strip creation step for partitioning the target image into strips having a horizontal width of a number of pixels less than a number of pixels of an image width and a vertical height of one pixel, wherein each of the strips is successively encoded.

18. The multi-color image encoding method of claim 17, wherein when said input color pixel data is encoded using said two-dimensional perimeter pixels, the position of each perimeter pixel is determined by a scanning distance from said target color pixel.

19. The multi-color image encoding method of claim 17, wherein the horizontal width of each said strip consists of 16–32 pixels.

20. The multi-color image encoding method of claim 17, wherein when said target color pixel data is encoded using Markov model reference pixels, the position of each reference pixel is determined by the scanning distance from said target color pixel.

21. The multi-color image encoding method of claim 17, wherein if the horizontal width of said target image is not evenly divisible by the horizontal width of the strip and the number of pixels in the horizontal width of the last strip is n, then the perimeter pixel that is one before the target pixel is the pixel input one before and the pixels on one line are n prior pixels, the pixel which is one advanced pixel is (n−1) prior pixel, the pixel which is one prior to the pixels on one line are (n+1) prior pixel, and an exception process is executed on said perimeter pixels that adopts one prior pixel when the value of (n−1) is 1 or less;

wherein a strip is handled by executing a process similar to said exception process of said perimeter pixels for said last strip as said reference pixel, and the two prior pixels are the reference pixels when the values of n and (n−1) is one or less.

22. A multi-color image encoding method, wherein target color pixel data are encoded and output as encoding data, the method comprising:

a strip creation step for partitioning a target image into strips having a horizontal width of a number of pixels less than a number of pixels of an image width and a vertical height of one pixel; and an encoding step for successively encoding each of the strips and an entropy encoding step for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders corresponding to the color pixel data that is input ahead of the target color pixel data, the combined color order table being generated by creating a complete latest appearance table that moves the color order of the color symbols corresponding to the color pixel data most recently input to an uppermost line, wherein when color symbols in the two-dimensional color order table overlap color symbols in the one-dimensional color order table, then the overlapped color symbols are not deleted from the one-dimensional color table.

23. A multi-color image decoding apparatus comprising:

entropy decoding means for transforming and outputting input target encoding data as color order data;

prediction means, having a color order table in which a color order of each color symbol is established, for reading from the color order table and outputting color symbols corresponding to the target color pixel data composed of a plurality of bits;

perimeter pixel generation means for outputting two-dimensional perimeter pixel data for the target color pixel data based on the color pixel data being decoded, wherein the color order table is created by combining a two-dimensional color order table which establishes the color order for the color symbols of each pixel of said two-dimensional perimeter pixel data and a one-dimensional color order table for lower color orders that establishes a predetermined number of color orders for the color symbols corresponding to the color pixel data which is output ahead of the target color pixel data, the combined color order table being generated by creating a complete latest appearance table that moves the color order of color symbols specified by the color order most recently input to an uppermost line, and the target encoding data is decoded and output as color pixel data using the color order data corresponding to the target encoding data; and strip combination means for partitioning and decoding the target image into strips having an horizontal width having a number of pixels less than a number of pixels of an image width and a vertical height of one pixel, the target image being decoded successively in strips.

24. A multi-color image decoding apparatus comprising:

entropy decoding means for transforming and outputting target encoding data as color order data;

prediction means, having a color order table in which the color order of each color symbol is established, for reading from the color order table and outputting color symbols corresponding to the target color pixel data composed of a plurality of bits;

perimeter pixel generation means for outputting two-dimensional perimeter pixel data for the target color pixel data based on the color pixel data being decoded, wherein the color order table is created by combining a two-dimensional color order table that establishes the color order for the color symbols of each pixel of said two-dimensional perimeter pixel data and a one-dimensional color order table for lower color orders that establishes a predetermined number of color orders for the color symbols corresponding to the color pixel data which is output ahead of the target color pixel data, the combined color order table being generated by creating a complete latest appearance table that moves the color order of color symbols specified by the color order most recently input to an uppermost line, and the target encoding data is decoded and output as color pixel data using the color order data corresponding to the target encoding data, wherein when color symbols in the two-dimensional color order table overlap color symbols in the one-dimensional color order table, the overlapped color symbols are not deleted from the one-dimensional color table; and strip combination means for partitioning and decoding the target image into strips with a horizontal width of a number of pixels less than a number of pixels of an image width and a vertical height of one pixel, the target image being decoded successively in strips.

25. A multi-color image decoding apparatus, wherein target encoding data are decoded and output as decoding data, the apparatus comprising:

a strip combination device that partitions a target image into strips having a horizontal width of a number of pixels less than a number of pixels of an image width and a vertical height of one pixel; and a decoder that successively decodes the strips of the target image and;

entropy encoding means for transforming color order data and outputting encoding data, wherein the color order table is created by combining:

a two-dimensional color order table that establishes the color order for the color symbols of each pixel of said two-dimensional perimeter pixel data, the color orders being used as upper color orders, and a one-dimensional color order table for lower color order that establishes a predetermined number of color orders for the color symbols corresponding to the color pixel data that is input ahead of the target color pixel data, the combined color order table being generated by creating a complete latest appearance table that moves the color order of the color symbols corresponding to the color pixel data most recently input to an uppermost line.

26. A multi-color image decoding method comprising:

a entropy decoding step for transforming and outputting input target encoding data as color order data;

a prediction step for reading from a color order table and outputting color symbols corresponding to the target color pixel data composed of a plurality of bits;

perimeter pixel generation step for outputting two-dimensional perimeter pixel data for the target color pixel data based on the color pixel data being decoded, wherein the color order table is created by combining a two-dimensional color order table that establishes the color order for the color symbols of each pixel of said two-dimensional perimeter pixel data and a one-dimensional color order table for lower color orders that establishes a predetermined number of color orders for the color symbols corresponding to the color pixel data that is output ahead of the target color pixel data, the combined color order table being generated by creating a complete latest appearance table that moves the color order of color symbols specified by the color order most recently input to an uppermost line, and the target encoding data is decoded and output as color pixel data using the color order data corresponding to the target encoding data; and a strip combination step for partitioning and decoding the target image into strips with a horizontal width of a number of pixels less than a number of pixels of an image width and a vertical height of one pixel, wherein the target image is decoded successively in strips.

27. A multi-color image decoding method comprising:

an entropy decoding step for transforming and outputting input target encoding data as color order data;

a prediction step for reading from a color order table color and outputting symbols corresponding to the target color pixel data composed of a plurality of bits;

a perimeter pixel generation step for outputting two-dimensional perimeter pixel data for the target color pixel data based on the color pixel data being decoded, wherein the color order table is created by combining a two-dimensional color order table that establishes the color order for the color symbols of each pixel of said two-dimensional perimeter pixel data and a one-dimensional color order table for lower color orders that establishes a predetermined number of color orders for the color symbols corresponding to the color pixel data that is output ahead of the target color pixel data, the combined color order table being generated by creating a complete latest appearance table that moves the color order of color symbols specified by the color order most recently input to an uppermost line, and the target encoding data is decoded and output as color pixel data using the color order data corresponding to the target encoding data, wherein when color symbols in the two-dimensional color order table overlap color symbols in the one-dimensional color order table, the overlapped color symbols are not deleted from the one-dimensional color table; and a strip combination step for partitioning and decoding the target image into strips with a horizontal width of a number of pixels less than a number of pixels of an image width and a vertical height of one pixel, wherein the target image is decoded successively in strips.

28. A multi-color image decoding method, wherein target color pixel data are decoded and output as decoding data, the method comprising;

a strip combination step for partitioning the target image into strips with a horizontal width of a number of pixels less than a number of pixels of an image width and a vertical height of one pixel; and a decoding step for successively decoding the strips of the target image;

an entropy encoding step for transforming the color order data and outputting encoding data, wherein the color order table is created by combining a two-dimensional color order table that establishes the color order for the color symbols of each pixel of said two-dimensional perimeter pixel data, the color orders being used as upper color orders, and a one-dimensional color order table for lower color orders that establishes a predetermined number of color orders corresponding to the color pixel data that is input ahead of the target color pixel data, the combined color order table being generated by creating a complete latest appearance table that moves the color order of the color symbols corresponding to the color pixel data most recently input to an uppermost line, wherein when color symbols in the two-dimensional color order table overlap color symbols in the one-dimensional color order table, then the overlapped color symbols are not deleted from the one-dimensional color table.

29. The multi-color image encoding apparatus of claim 1, wherein the strip creation means partitions the target image into strips and, for target color pixel data of at least one strip, the one-dimensional color order table and the two-dimensional color order table have at least two common color symbols and the combined color order table comprises the common color symbols twice.

30. The multi-color image encoding apparatus of claim 6, wherein the strip creation means partitions the target image into strips and, for target color pixel data of at least one strip, the one-dimensional color order table and the two-dimensional color order table have at least two common color symbols and the combined color order table comprises the common color symbols twice.

31. The multi-color image encoding method of claim 12, wherein the strip creation means partitions the target image into strips and, for target color pixel data of at least one strip, the one-dimensional color order table and the two-dimensional color order table have at least two common color symbols and the combined color order table comprises the common color symbols twice.

32. The multi-color image encoding method of claim 17, wherein the strip creation means partitions the target image into strips and, for target color pixel data of at least one strip, the one-dimensional color order table and the two-dimensional color order table have at least two common color symbols and the combined color order table comprises the common color symbols twice.

* * * * *